US012773031B2

(12) United States Patent
Barney et al.

(10) Patent No.: US 12,773,031 B2
(45) Date of Patent: Oct. 27, 2026

(54) HEAT PRESS APPARATUSES, SYSTEMS, AND METHODS

(71) Applicant: Cricut, Inc., South Jordan, UT (US)

(72) Inventors: Kristy Lynn Barney, Lehi, UT (US); Mitchell Alan Cheever, Brigham City, UT (US); Yung Tseng Chen, San Francisco, CA (US); Hayley Ketch, Alpine, UT (US); Ildefonso M. Resuello, Jr., Sacramento, CA (US)

(73) Assignee: Cricut, Inc., South Jordan, UT (US)

( * ) Notice: Subject to any disclaimer, the term of this patent is extended or adjusted under 35 U.S.C. 154(b) by 0 days.

(21) Appl. No.: 19/252,292

(22) Filed: Jun. 27, 2025

(65) Prior Publication Data

US 2025/0386892 A1 Dec. 25, 2025

Related U.S. Application Data

(63) Continuation of application No. 18/357,017, filed on Jul. 21, 2023, now Pat. No. 12,389,974, which is a continuation of application No. 17/653,464, filed on Mar. 3, 2022, now Pat. No. 11,707,104.

(51) Int. Cl.

| | |
|---|---|
| ***A42C 1/08*** | (2006.01) |
| ***B30B 9/00*** | (2006.01) |
| ***B30B 15/06*** | (2006.01) |
| ***B32B 37/06*** | (2006.01) |
| ***B41F 16/02*** | (2006.01) |
| ***D06F 75/08*** | (2006.01) |
| ***D06F 79/02*** | (2006.01) |

(52) U.S. Cl.

CPC .................. *A42C 1/08* (2013.01); *B30B 9/00* (2013.01); *B30B 15/064* (2013.01); *B32B 37/06* (2013.01); *B41F 16/02* (2013.01); *D06F 75/08* (2013.01); *D06F 79/02* (2013.01)

(58) Field of Classification Search

CPC .......... A41H 17/00; A42B 1/002; A42C 1/00; A42C 1/02; A42C 1/04; A42C 1/08; A42C 3/00; A42C 3/02; A42C 3/04; A47F 7/06; A47F 7/065; A47G 25/10; D06F 79/02; D06F 83/00; D06F 85/00

USPC ............................................... 223/24, 25, 26

See application file for complete search history.

(56) References Cited

U.S. PATENT DOCUMENTS

| | | | | |
|---|---|---|---|---|
| 1,656,320 A | | 1/1928 | Crowder | |
| 1,738,845 A | | 12/1929 | Rollman | |
| 2,514,400 A | | 7/1950 | Larkins | |
| 3,184,194 A | | 5/1965 | Beck | |
| 3,202,389 A | | 8/1965 | Zoffer | |
| 3,310,267 A | * | 3/1967 | Koehler | A47F 7/065 269/95 |
| 3,477,672 A | | 11/1969 | Agrusa | |

(Continued)

FOREIGN PATENT DOCUMENTS

| | | |
|---|---|---|
| CA | 3078005 | 10/2020 |
| CA | 3078005 A1 | 10/2020 |
| EP | 3999681 | 6/2023 |

*Primary Examiner* — F Griffin Hall

(57) ABSTRACT

A hat form for a heat press that is configured to support a workpiece (e.g., a hat) during a heat-activated design transfer using the heat press. The hat form may include a cover at least partially defining an internal volume of the hat form and a filler material disposed within and at least partially occupying the internal volume.

20 Claims, 15 Drawing Sheets

(56) References Cited

U.S. PATENT DOCUMENTS

| | | | | |
|---|---|---|---|---|
| 3,824,715 | A * | 7/1974 | Vaughan, Jr. | A43B 3/16 36/7.3 |
| 5,161,719 | A * | 11/1992 | Otteson | D06F 59/02 223/66 |
| 5,725,134 | A * | 3/1998 | Weltge | A42B 1/002 223/24 |
| 6,209,605 | B1 * | 4/2001 | Lee | B65C 9/24 118/667 |
| 6,226,904 | B1 | 5/2001 | Brady | |
| 6,250,593 | B1 | 6/2001 | Palu | |
| 6,648,189 | B1 * | 11/2003 | Minton | C08G 18/4833 223/24 |
| 7,380,691 | B2 * | 6/2008 | Kroll | A42B 1/002 223/7 |
| 7,665,236 | B2 | 2/2010 | Jones | |
| 8,191,742 | B1 * | 6/2012 | Brewer | A42B 1/002 223/12 |
| 9,402,445 | B2 * | 8/2016 | Miller | A43B 3/0084 |
| 9,585,438 | B2 * | 3/2017 | Johnson | B29D 35/146 |
| 9,687,038 | B2 * | 6/2017 | Chae | A42C 1/08 |
| 10,632,782 | B1 * | 4/2020 | Cheever | B32B 5/24 |
| 10,751,964 | B2 | 8/2020 | Galkin et al. | |
| 11,155,116 | B2 * | 10/2021 | Figueroa | B44C 1/1725 |
| 11,155,957 | B2 | 10/2021 | Alipour | |
| 11,945,245 | B2 | 4/2024 | Elzey | |
| 12,059,050 | B2 * | 8/2024 | Robinson | A42C 1/08 |
| 2010/0219214 | A1 * | 9/2010 | Pullum | A47F 7/06 223/84 |
| 2015/0225889 | A1 | 8/2015 | Whitney | |
| 2018/0030646 | A1 | 2/2018 | Kumar et al. | |

* cited by examiner

HEAT PRESS APPARATUSES, SYSTEMS, AND METHODS

CROSS-REFERENCES TO RELATED APPLICATIONS

This is a continuation application of and claims priority to and the benefit of U.S. patent application Ser. No. 18/357,017 entitled "Heat Press Apparatuses, Systems, and Methods" filed on Jul. 21, 2023, which is a continuation of and claims priority to and the benefit of U.S. patent application Ser. No. 17/653,464 entitled "Heat Press Apparatuses, Systems, and Methods" filed on Mar. 3, 2022 (now U.S. Pat. No. 11,707,104), both of which are incorporated herein by reference.

FIELD

This disclosure relates generally to heat presses, components, apparatuses, systems, and methods.

BACKGROUND

While known heat presses, components, apparatuses, systems, and methods have proven to be acceptable for various applications, such heat presses, components, apparatuses, systems, and methods are nevertheless susceptible to improvements that may enhance their overall performance and cost. Therefore, a need exists to develop improved heat press components, apparatuses, systems, and methods that advance the art.

SUMMARY

The subject matter of the present disclosure has been developed in response to the present state of the art, and in particular, in response to the problems and needs in the art that have not yet been fully solved by currently available heat presses. Accordingly, the present disclosure has been developed to provide a heat press and related components, apparatuses, systems and methods that overcome many or all of the above-discussed shortcomings in the art, in accordance with various embodiments.

Disclosed herein, according to various embodiments, is a heat press that comprises a handle portion configured to be grasped by a user and a heat plate coupled to the handle portion, with the heat plate having a curved engagement surface. That is, the curved engagement surface may be configured to engage a heat-activated design implement to transfer a design of the heat-activated design implement to a curved surface of a workpiece. In various embodiments, wherein the curved engagement surface is concave. In various embodiments, the curved engagement surface is curved about a single axis of curvature.

According to various embodiments, the curved engagement surface comprises an apex axis and a radius of curvature, with a maximum distance between the apex axis and an outward surface of the handle portion opposite the heat plate being equal to or less than the radius of curvature. In various embodiments, the handle portion comprises an inner support structure and an exterior housing, with the heat plate being coupled to the inner support structure. In various embodiments, the heat press further includes a skirt generally disposed between the inner support structure and the heat plate. The inner support structure may be directly mounted to a first side of the skirt and the heat plate may be directly mounted to a second side of the skirt opposite the first side.

In various embodiments, the heat press further includes a first insulation layer disposed between the inner support structure and the skirt. The heat press may include a second insulation layer disposed between the skirt and the heat plate. In various embodiments, the inner support structure defines a lower curved segment and an upper segment. In various embodiments, the upper segment of the inner support structure of the handle portion, together with the exterior housing of the handle portion, define a hand clearance opening for the user. The heat press may further include a third insulation layer disposed between the lower curved segment of the inner support structure and the hand clearance opening. In various embodiments, one or more of the inner support structure, the first insulation layer, the skirt, and the second insulation layer comprises a lower curved surface that generally matches a curvature of the curved engagement surface of the heat plate. In various embodiments, each of the inner support structure, the first insulation layer, the skirt, and the second insulation layer comprises a lower curved surface that generally matches a curvature of the curved engagement surface of the heat plate.

Also disclosed herein, according to various embodiments, is a heat press stand that includes a curved floor. The curved floor may comprise an upper convex surface. The heat press stand may also include a plurality of heat plate support protrusions adjacent the upper convex surface of the curved floor. The plurality of heat plate support protrusions may be configured to contact a curved engagement surface of a heat plate of a heat press to support the heat press in a docked position relative to the heat press stand. In various embodiments, the upper convex surface of the curved floor is curved about a single axis of curvature. In various embodiments, the single axis of curvature is disposed below a lowermost portion of the heat press stand.

In various embodiments, the curved floor comprises a lower concave surface. A thickness of the curved floor between the upper convex surface and the lower concave surface is substantially uniform, according to various embodiments. In various embodiments, the curved floor comprises a plurality of perforations that extend from the upper convex surface to the lower concave surface. In various embodiments, the heat press stand further includes a plurality of louvres that extend from the lower concave surface of the curved floor and at least partially extend across a lower opening of the plurality of perforations.

In various embodiments, the curved floor is a section of a main body of the heat press stand, with the main body also comprising body walls extending upwards around the curved floor. In various embodiments, the body walls define a nest region. In various embodiments, the plurality of heat plate support protrusions may be features of an insert disposed within the nest region. The insert may have insert walls that extend upwards from around the curved floor of the main body.

Also disclosed herein, according to various embodiments, is a hat form of a heat press system. The hat form may include a cover at least partially defining an internal volume of the hat form and a fill material disposed within and at least partially occupying the internal volume. In various embodiments, the cover comprises a heat resistant fabric. In various embodiments, the cover comprises a metallic coating.

The hat form may further include a base, and the cover may be coupled to the base. In various embodiments, the cover and the base together define the internal volume of the hat form. In various embodiments, the base has a perimeter/periphery, and the cover may be coupled to the base along the perimeter. In various embodiments, a radially outward surface of the cover is configured to engage a curved workpiece, wherein the radially outward surface of the cover is convex.

In various embodiments, the base comprises a polyester fabric. The hat form may also include a handle coupled to the base. The hat form may also include a support body extending from the base into the internal volume of the hat form. The support body may have a frustoconical shape. In various embodiments, a volume ratio of the fill material to the support body in the internal volume is between about 1:1 and about 4:1. In various embodiments, a volume ratio of the fill material to the support body in the internal volume is between about 1.5:1 and about 3:1. In various embodiments, the fill material occupies more than 50% of the internal volume and the support body occupies less than 50% of the internal volume. In various embodiments, the fill material is a granular material. For example, the granular material may comprise a conglomeration of shells from at least one of nuts, drupes, and/or legumes. In various embodiments, the granular material comprises walnut shells.

The heat form may further include a liner disposed between the cover and the fill material. In various embodiments, the hat form further includes a liner disposed between the fill material and the support body. In various embodiments, the hat form further includes a liner disposed between the support body and the base.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

In order that the advantages of the disclosure will be readily understood, a more particular description of the disclosure briefly described above will be rendered by reference to specific embodiments that are illustrated in the appended drawings. Thus, although the subject matter of the present disclosure is particularly pointed out and distinctly claimed in the concluding portion of the specification, a more complete understanding of the present disclosure, may best be obtained by referring to the detailed description and claims when considered in connection with the drawing figures. Understanding that these drawings depict only typical embodiments of the disclosure and are not therefore to be considered to be limiting of its scope, the subject matter of the present application will be described and explained with additional specificity and detail through the use of the accompanying drawings, in which:

DETAILED DESCRIPTION

Figure 1A:
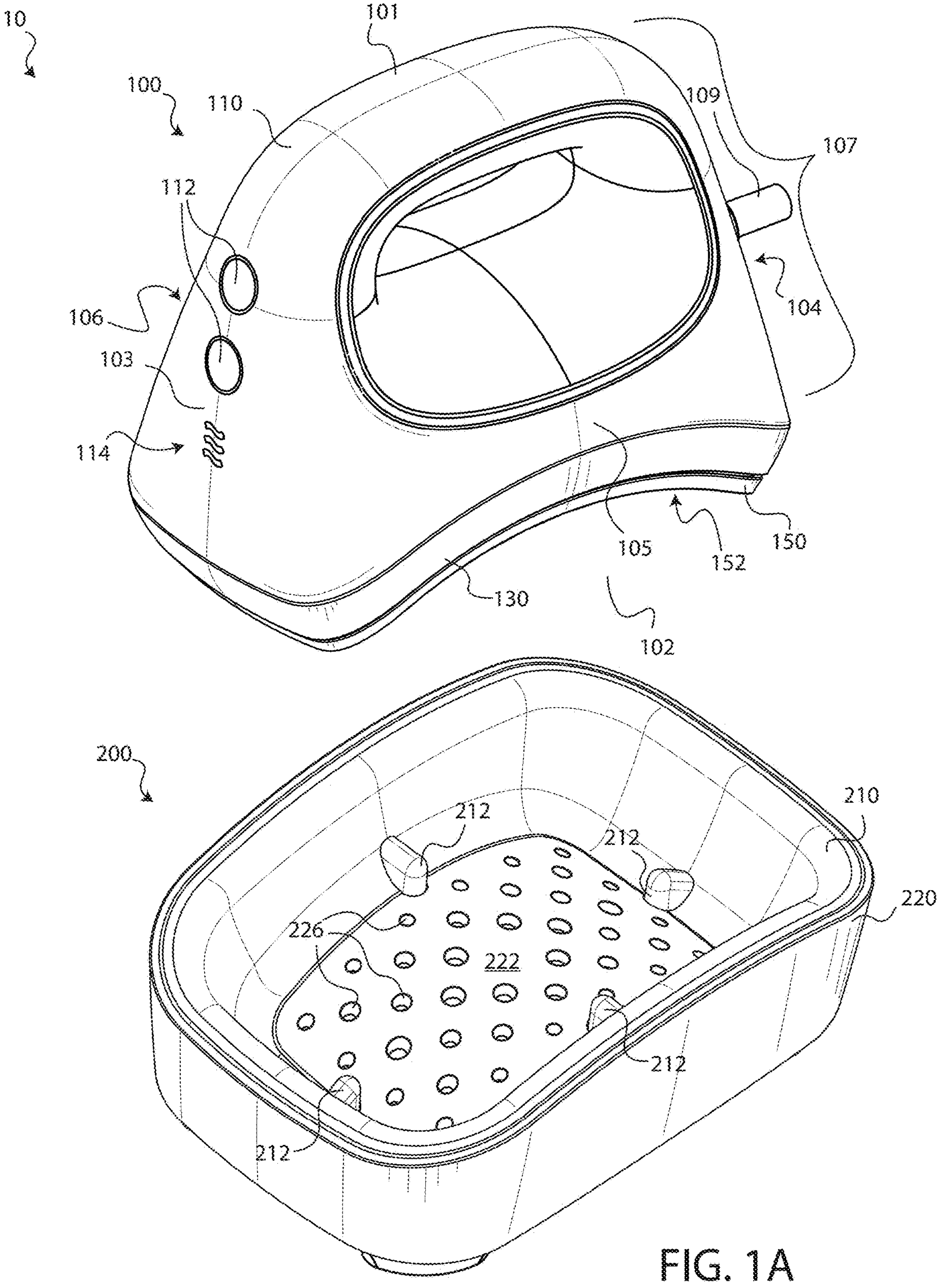
FIG. 1A is a perspective view of various components of a heat press system, showing a heat press removed a distance from a heat press stand, in accordance with various embodiments.

The detailed description of exemplary embodiments herein refers to the accompanying drawings, which show exemplary embodiments by way of illustration. While these exemplary embodiments are described in sufficient detail to enable those skilled in the art to practice the disclosure, other embodiments may be realized and logical changes and adaptations in design and construction may be made in accordance with this disclosure without departing from the spirit and scope of the disclosure. Thus, the detailed description herein is presented for purposes of illustration only and not of limitation.

The present disclosure relates generally to heat presses, heat press systems, heat press stands (also known as heat press bases or heat press holders), forms for facilitating a heat press procedure, and other components, and the related methods of using and/or operating the foregoing. While numerous details, components, features, functionality, and examples are included herein pertaining to heat presses and their related systems and methods, the present disclosure is not necessarily so limited, and thus aspects of the disclosed embodiments may be adapted for performance in a variety of other industries. As such, numerous applications of the present disclosure may be realized.

Generally, the heat press disclosed herein includes a heat plate having a curved engagement surface that is configured to engage a curved surface of a workpiece, according to various embodiments. The curved engagement surface of the heat plate may be configured to engage a heat-activated design implement (e.g., against the curved surface of the workpiece) to transfer a design of the heat-activated design implement to the curved surface of the workpiece. The curved nature of the heat plate may be especially beneficial for performing heat press design transfers to workpieces having curved surfaces, such as hats, visors, bags, balls, containers, etc.

The heat press also generally includes a handle portion, configured to be grasped by a user, with the heat plate being coupled to the handle portion, as described in greater detail below. Thus, the heat press disclosed herein generally includes an integrated handle on one end of the heat press with the heat plate being disposed on the opposing end of the heat press, according to various embodiments. Accordingly, the heat press may have a ‘small’ (e.g., handheld) form-factor and may be portable, as described in greater detail below.

The present disclosure also generally provides a heat press stand having a curved floor that generally complements and/or matches the curved engagement surface of the heat plate of the heat press. The heat press stand may be generally configured to safely support and/or hold the heat press in a docked/docking/stowed position when not in use. As described in greater detail below, the heat press stand may be configured with features to enable the heat press to be safely supported even when the heat plate is active and at temperature. That is, the heat press stand may be configured to mitigate heat transfer from the heat plate to a table or other supporting surface upon which the heat press stand is disposed, and may facilitate maintaining the temperature of the handle portion of the heat press at a sufficiently low temperature such that the handle portion is safe to be grasped by a user.

Also disclosed herein, according to various embodiments, is a form (referred to herein as a “hat form”) that is configured to support and/or retain the workpiece in a desired orientation during a heat press procedure. Generally, the hat form comprises one or more curved surfaces upon and/or around which a workpiece may be positioned, and the workpiece and a heat-activated design implement may be compressed between the curved engagement surface of the heat plate of the heat press and the curved surface of the hat form to facilitate transfer of a design from the heat-activated design implement to the workpiece, according to various embodiments. As described in greater detail below, the hat form may be a separate component from the heat press, and thus the hat form and the heat press may be independently manipulated during a heat press procedure to provide functional flexibility during the process of transferring a design from a heat-activated design implement to a workpiece.

The heat press, the heat press stand, and the hat form may be combined in various groupings to form a heat press system. For example, in various embodiments of the disclosure the heat press system includes a heat press and a heat press stand. However, in various other embodiments of the disclosure the heat press system includes a heat press and a hat form. Further, a heat press system may include a heat press stand and a hat form. Still further, a heat press system may include all three of the heat press, the heat press stand, and the hat form.

With all of the components and aspects of the present disclosure generally introduced above, attention is now drawn to the accompanying figures and the following paragraphs, which provide additional and specific details pertaining to various embodiments of one or more heat press systems, one or more heat presses, one or more heat press stands, and one or more hat forms. That is, the heat press is generally described below with reference to FIGS. 1A, 1B, 2, 3, and 4, the heat press stand is generally described below with reference to FIGS. 5, 6, and 7, and the hat form is generally described below with reference to FIGS. 8, 9A, 9B, and 9C. FIGS. 10A, 10B, 10C, and 10D generally provide examples of various stages/steps of a method of using the heat press system(s) disclosed herein, and FIG. 11 generally provides a schematic depiction of a computing device for operating and/or controlling the heat press.

Figure 1B:
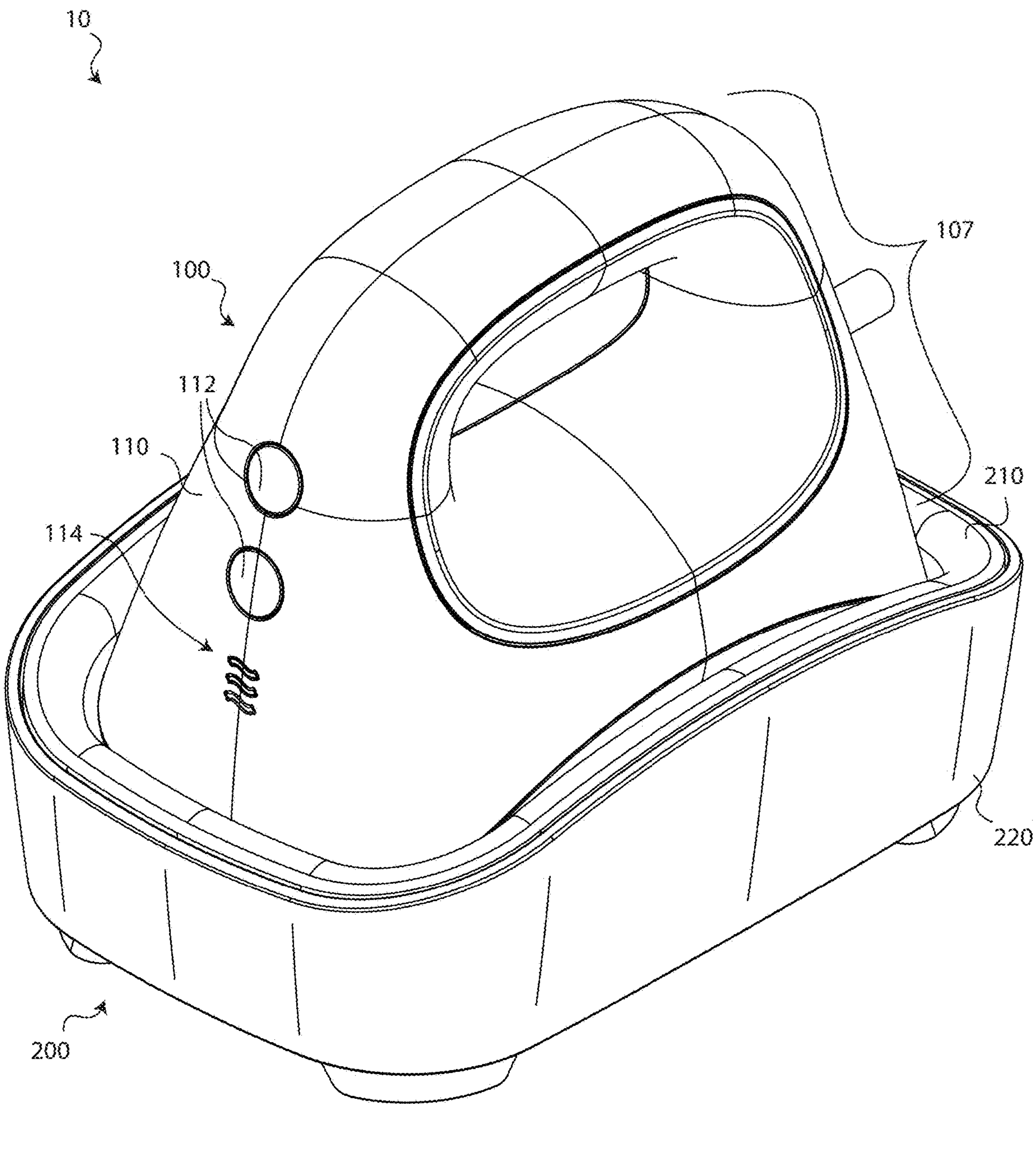
FIG. 1B is a perspective view of the heat press system of FIG. 1A, showing the heat press engaged on the heat press stand, in accordance with various embodiments.

In various embodiments, and with reference to FIGS. 1A and 1B, a heat press system 10 is provided that comprises a heat press stand 200 and a heat press 100 having a curved heat plate 150. As seen in FIG. 1B, the heat press 100 may be selectively supported by the heat press stand 200 (also referred to herein as a heat press docking station or simply a docking base). Some aspects described herein may be directed to a method of utilizing the heat press 100 for the purpose of heat-activating a heat-activated design implement 14 (e.g., see FIGS. 10C and 10D) for transferring a design of the heat-activated design implement 14 to a workpiece 12 (e.g., see FIGS. 10A, 10B, 10C, and 10D). For example, the heat-activated design implement 14 may include a heat-activated adhesive for attaching a design element to the workpiece, and/or the heat-activated design implement 14 may include one or more sublimation ink compositions that are configured to undergo sublimation transfer from a working substrate to the workpiece 12.

In some configurations, the heat press 100 disclosed herein may be sized to be relatively small, compact, and portable to enable users to manipulate and apply heat to the heat-activated design implement 14 in the course of preparing arts-and-craft projects. The terms “compact,” “miniaturized,” “small,” “portable,” or other similar terms used herein to describe the heat press 100 are not meant as limiting; rather, these terms are used in reference to other commercially available heat presses. As such, the heat press 100 may not be intended for use in large industrial applications that may otherwise have to be operated by specially trained individuals and manufacturers. Accordingly, the heat press 100 may be referred to as a compact, home-use consumer device that is light weight, portable, and easy to operate for by an untrained person. For example, the heat press 100 may have a handle portion 107, to which the heat plate 150 is coupled, and the handle portion 107 may be graspable by a user to allow the user to easily move, position, and/or orient the heat press 100 relative to the workpiece.

In various embodiments, the heat press 100 is configured to be used with workpieces having curved exterior surfaces, such as hats, visors, bags, balls, containers, shoes, toys such as stuffed animals, pillows, and the like. Accordingly, the specific shape and geometry of the curved heat plate 150 may be well-suited and adapted for corresponding geometries, shapes, and contours of various portions of a workpiece, thereby enabling the application of precise heat to curved areas and curved contours of heat-activated design implements 14 and/or workpieces 12.

In various embodiments, the heat press 100 may include electronics (e.g., power supply components, user interface components, temperature control components, and the like). In some configurations, the heat press 100 may include one or more materials, such as insulative layers, that protect such electronic components from heat produced by the heat press 100. Additional details pertaining to the internal components of the heat press 100 are included below with reference to FIGS. 3 and 4.

In various embodiments, the heat press 100 provides substantially even heat distribution across the heat plate 150 to enable use thereof with, for example, arts-and-craft projects. In some instances, an aspect of the present disclosure provides even heat distribution to across the curved engagement surface 152 of the heat plate 150. In some implementations, the heat press 100 is configured to provide temperature control of the heat plate 150 in order to maintain the temperature of the curved engagement surface 152 of the heat plate 150. Accordingly, control over the temperature of the heat plate 150 may provide for sufficient heating of diverse materials forming the heat-activated design implement 14 and/or the workpiece 12 in order to ensure a consistent and desirable bonding/transfer of the heat-activated design implement 14 to the workpiece 12.

The heat press 100 may include an exterior housing 110. The exterior housing 110 generally defines the outer surfaces of the heat press 100, and portions of the exterior housing 110 may generally define the aforementioned handle portion 107. The exterior housing 110 may have define a first or proximal end 101 of the heat press 100, with the heat plate 150 generally situated at, and at least partially defining, a second or distal end 102 of the heat press 100. The exterior housing 110 may also define a third lateral end 103 and a fourth lateral end 104 of the heat press 100 that generally form opposing edges of the exterior housing 110 that extend between the proximal end 101 and the distal end 102. The exterior housing 110 further defines a front side 105 and a back side 106 of the heat press 100 that generally form opposing front and back surfaces of the heat press 100, in accordance with various embodiments.

The exterior housing 110 may be made of plastic materials, such as, for example, polycarbonate (PC), acrylonitrile butadiene styrene (ABS), a blend of PC and ABS, or the like. Such plastic materials may result in the exterior housing 110 not melting when exposed to high temperatures, such as a temperature as high as, for example, 205° C. created by the heat plate 150. The material of the exterior housing 110 may also have sufficient structural strength and/or rigidity to prevent deformation in response to external forces or pressures are applied by a user during use of heat press 100.

Figure 2:
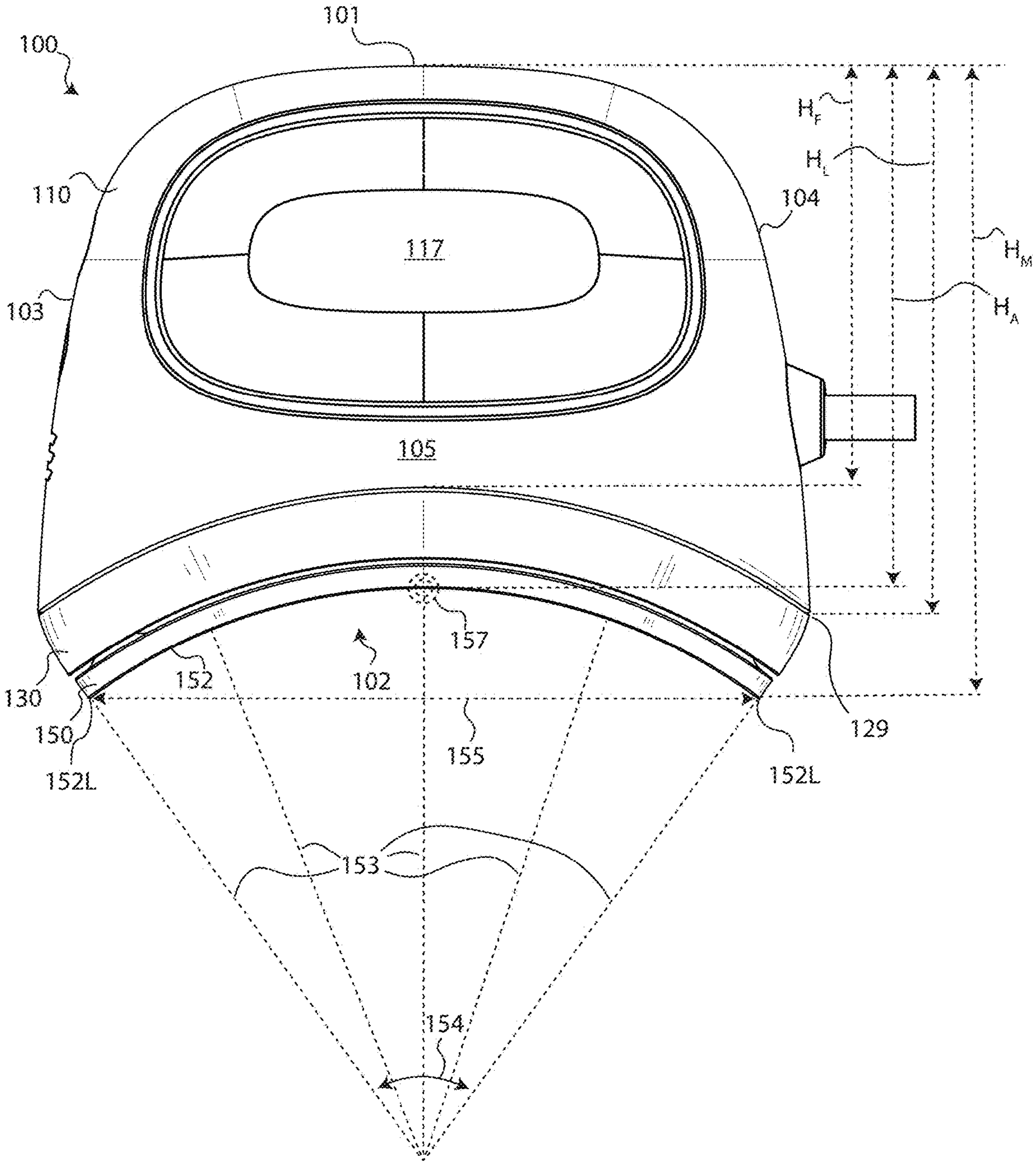
FIG. 2 is a front view a heat press, in accordance with various embodiments.

As seen at FIGS. 1 and 2, the exterior housing 110 may generally define a handle portion 107. The handle portion 107 of the exterior housing 110 may define a hand clearance opening 117 which provides a user with a secure grasping surface for holding and manipulating the heat press 100. Thus, the hand clearance opening 117 of the handle portion 107 may be configured/sized for permitting insertion of a user's fingers such that the user's fingers may wrap around and grasp the handle portion 107 (e.g., the portion of the exterior housing 110 between the hand clearance opening 117 and the proximal end 101 of the heat press 100) and subsequently impart a force for applying pressure to one or both of the heat-activated design implement 14 and the workpiece 12 during use of the heat press 100. The configuration of the handle portion 107 and the hand clearance opening 1117 results in the user's fingers being sufficiently spaced away from the second or distal end 102 of the heat press 100. In various embodiments, the hand clearance opening may comprise one or more opposing recesses/indentations, or the hand clearance opening 117 may be a pass-through aperture that extends entirely through the heat press 100 from the front side 105 to the back side 106.

One or both of the exterior housing 110 and the hand clearance opening 117 may be shaped to define other forms or shapes without departing from the advantages provided thereby. In addition, the size, shape, and specific configuration of exterior housing 110 and the handle portion 107 may vary in one or more other configurations without departing from the intended use of the heat press 100. For example, in some implementations, the upper portion of the exterior housing 110 that forms the handle portion 107 may include finger contours or other gripping features that aids the user in ergonomically grasping the heat press 100.

In various embodiments, the heat press 100 further includes a power cord 109 (only partially shown in the figures) that provides power to electrical components of the heat press 100. In some implementations, the power cord 109 provides power to temperature control components, user interface components, and/or other electronic components of the heat press 100. The heat press 100 may also include a user interface, and the user interface may comprise one or more buttons 112 and/or one or more temperature indicators 114 that are powered by power supplied from the power cord 109. The one or more buttons 112 and the one or more temperature indicators 114 may be disposed on the third lateral end 103 of the heat press 100. In various embodiments, the various user interface components may be aligned along the third lateral end 103 of the heat press 100. Said differently, a substantially straight line extending across and along the surface of the third lateral end 103 of the heat press 100 may intersect each of the one or more buttons 112 and each of the one or more temperature indicators 114. In various embodiments, the number of buttons 112 is two (2) and the number of temperature indicators is three (3).

The one or more buttons 112 may be actuated (e.g., pressed) by a user for powering on or powering off the heat press 100. In various embodiments, a visual indicator, such as, for example, a light source, may inform a user when the heat press 100 is activated or deactivated. The one or more temperature indicators 114 may include one or more light sources that may, for example, communicate the temperature level and/or heat setting of the heat plate 150. In at least one embodiment, the one or more buttons 112 serve as both an on/off power button as well as a temperature setting button. In some instances, the one or more buttons 112 may be actuated in order to turn the heat press 100 on and then pressed again to set the temperature of heat plate 150. By actuating the one or more buttons 112, a low temperature setting, a medium temperature setting, or a high temperature setting may be selected by the user and, as explained above, the one or more light source indicators may be illuminated in order to communicate to a user a selected setting of the heat press 100. Subsequently, the one or more buttons 112 can then be actuated again in order to turn the heat press 100 off. As described in greater detail below, in various embodiments the heat press 100 may be wirelessly controlled via a remote computing device (e.g., a laptop, smart phone, etc.), and thus the user interface buttons may be omitted.

Turning now to FIG. 2, details pertaining to the shape, size, geometry, and general configuration of the heat plate 150 of the heat press 100 are provided. In various embodiments, the heat plate 150 comprises a curved engagement surface 152. The curved engagement surface 152 may generally define at least a portion of the distal end 102 of the heat press 100. In various embodiments, the curved engagement surface 152 is concave. The curved engagement surface 152 may be curved about a single axis of curvature. Said differently, lines extending across and along the curved engagement surface 152 from the third lateral end 103 toward the fourth lateral end 104 may have the curvature depicted in FIG. 2 while lines extending across and along the curved engagement surface 152 from the front side 105 toward the back side 106 of the heat press 100 may be substantially straight, having no curvature, according to various embodiments.

In various embodiments, the curved engagement surface 152 has an apex 157, also referred to herein as an apex axis. The apex 157 of the concave, curved engagement surface 152 is defined as the point/axis closest to the proximal end 101 of the heat press 100. Said differently, the apex 157 of the curved engagement surface 152 bisects the curved engagement surface 152, according to various embodiments. In various embodiments, the width of the heat plate 150 (e.g., the dimension of the apex axis 157 . . . that spans across the heat plate 150 into the page in FIG. 2) is between about 2.0 inches (51 millimeters) and about 6.0 inches (152 millimeters). In various embodiments, the width of the heat plate 150 is between about 2.5 inches (63 millimeters) and about 4.0 inches (102 millimeters). In various embodiments, the width of the heat plate 150 is about 3.0 inches (76 millimeters). As used in this context only, the term "about" means plus or minus 0.1 inches. In various embodiments, the curved length of the heat plate 150 (e.g., the maximum dimension that spans across the curved engagement surface 152 of the heat plate 150, perpendicular to the apex axis 157), is between about 3.0 inches (76 millimeters) and about 7.0 inches (178 millimeters). In various embodiments, the curved length of the heat plate 150 is between about 3.5 inches (89 millimeters) and about 6.0 inches (152 millimeters). In various embodiments, the curved length of the heat plate 150 is about 5.0 inches (127 millimeters). As used in this context only, the term "about" means plus or minus 0.1 inches. In various embodiments, the width of the heat plate 150 is between about 40% and about 75% of the curved length of the heat plate 150. In various embodiments, the width of the heat plate 150 is between about 50% and about 60% of the curved length of the heat plate 150. In various embodiments, the width of the heat plate 150 is about 60% of the curved length of the heat plate 150. As used in this context only, the term "about" means plus or minus 2%.

In various embodiments, the curved engagement surface 152 has a geometry characterized by: a radius (or radii) of curvature 153, defined as the radius of the circular arc which approximates the curvature of the curved engagement surface 152; a degree of curvature 154, defined as the central angle of the arc that lies on the curved engagement surface 152; and a chord length of curvature 155, defined as the length of the line segment extending between opposing lateral edges 152L of the arc that lies on the curved engagement surface 152.

In various embodiments, the radius of curvature 153 is between about 3.0 inches (76 millimeters) and about 6.0 inches (127 millimeters). In various embodiments, the radius of curvature 153 is between about inches and about 3.5 inches (89 millimeters) and about 4.5 inches (114 millimeters). In various embodiments, the radius of curvature 153 is between about inches and about 3.75 inches (95 millimeters) and about 4.25 inches (108 millimeters). In various embodiments, the radius of curvature 153 is 4.0 inches (102 millimeters). In various embodiments, the radius of curvature 153 is about 4.04 inches (102.6 millimeters). As used in this context only, the term "about" means plus or minus 0.1 inches (2.54 millimeters).

In various embodiments, the degree of curvature 154 is between about 30 degrees and about 180 degrees. In various embodiments, the degree of curvature 154 is between about 40 degrees and about 115 degrees. In various embodiments, the degree of curvature 154 is between about 60 degrees and about 90 degrees. In various embodiments, the degree of curvature 154 is between about 65 degrees and about 80 degrees. In various embodiments, the degree of curvature 154 is about 73 degrees. In various embodiments, the degree of curvature 154 is 73.3 degrees. As used in this context only, the term "about" means plus or minus 2 degrees.

In various embodiments, the chord length of curvature 155 is between about 2.0 inches (51 millimeters) and about 8.0 inches (203 millimeters). In various embodiments, the chord length of curvature 155 is between about 2.75 inches (70 millimeters) and about 6.25 inches (159 millimeters). In various embodiments, the chord length of curvature 155 is between about 4.0 inches (102 millimeters) and about 5.5 inches (140 millimeters). In various embodiments, the chord length of curvature 155 is about 4.8 inches (122 millimeters). In various embodiments, the chord length of curvature 155 is 4.83 inches. As used in this context only, the term "about" means plus or minus 0.1 inches (2.54 millimeters).

The size and/or dimension of various sections, portions, and features of the heat press 100, relative to each other, may provide various portability, manipulability, and useability benefits, especially when considering the curved heat plate 150 and the various curvatures of possible workpieces that can be worked upon. Said differently, balancing the relative lengths and geometries of various features of the heat press 100 may promote and/or enhance the ability of a user to operate the heat press 100 to effectively work on different/varying workpieces. For example, if the curvature specifications of the heat plate 150 are not balanced with the overall size and/or shape of the entire heat press 100, the heat press 100 may prove to be unwieldy for various purposes and/or may inhibit useability and/or manipulability of the heat press 100 during the process of transferring a heat-activated design to a workpiece.

For purposes of comparing the curvature specifications of the heat plate 150 to the size of the heat press 100 generally, various heights of the heat press 100 are shown and defined with reference to FIG. 2. As used in this context, the term "height" refers to a distance defined in a vertical direction as characterized with the heat press 100 oriented in the stowed engagement relative to the heat press stand 200 shown in FIG. 1B, with the distal end 102 (i.e., the heat plate 150) facing downward and the proximal end 101 facing upward. That is, the term "height" refers to a distance parallel with a vertical longitudinal axis of the heat press 100 that extends centrally and vertically through the heat plate 150 and centrally and vertically through the handle portion 107.

As shown in FIG. 2, a front height $H_F$ of the exterior housing 110 is defined between the top/upward surface (i.e., the proximal end 101) of the heat press 100 and the lower end of the exterior housing 110 on the front side 105 of the heat press 100 (adjacent the apex axis 157 of the curved engagement surface 152 of the heat plate 150). Correspondingly, a lateral height $H_L$ of the exterior housing 110 is defined between the top/upward surface (i.e., the proximal end 101) of the heat press 100 and the lower end of the exterior housing 110 on the third/fourth lateral end 103, 104 of the heat press 100 (adjacent the lateral edges 152L of the heat plate 150). The lower edge of the exterior housing 110 may generally match the curvature of the heat plate 150, and thus the front height $H_F$ is less than the lateral height $H_L$, according to various embodiments. A maximum height $H_M$ of the heat press 100 is defined between the top/upward surface (i.e., the proximal end 101) of the heat press 100 and the lowest point of the distal end 102 of the heat press 100 (i.e., the lateral edges 152L of the heat plate 150). Finally, an apex height $H_A$ of the heat press 100 is defined between the top/upward surface (i.e., the proximal end 101) of the heat press 100 and the apex axis 157 of the heat curved engagement surface 152 of the heat plate 150. Said differently, the apex height $H_A$ is the maximum distance between the apex axis 157 and an outward/upper surface of proximal end 101 of the handle portion 107 of the heat press 100 opposite the heat plate 150. As may be readily apparent, the maximum height $H_M$ of the heat press 100 is greater than the apex height $H_A$ of the heat press 100.

In various embodiments, the radius of curvature 153 is less than the chord length of curvature 155. For example, the radius of curvature 153 may be between 70% and 100% of the chord length of curvature 155, or more specifically between 80% and 90% of the chord length of curvature 155, or about 85% of the chord length of curvature 155. In various embodiments, the radius of curvature 153 is less than the maximum height $H_M$ of the heat press 100. In various embodiments, the maximum height $H_M$ of the heat press 100 is less than the chord length of curvature 155. For example: the radius of curvature 153<maximum height $H_M$<the chord length of curvature 155. However, in various embodiments, the radius of curvature 153 may be equal to or greater than the apex height $H_A$ of the heat press 100. For example: $H_A$<radius of curvature 153<$H_M$. By so sizing the radius of curvature 153 relative to the indicated heights of the heat press 100, the portability, manipulability, and useability of the heat press 100 may be improved over conventional heat presses that may have larger form factor housings/handles.

In various embodiments, the lateral height $H_L$ of the heat press 100 is greater than the apex height $H_A$ of the heat press 100. Said differently, the junction/interface 129 between the exterior housing 110 and the skirt 130 (e.g., the point at which the heat press transitions from a diverging to a converging shape . . . see below) is lower than the apex axis 157 of the curved engagement surface 152 of the heat plate 150. The technical effect of having this relative relationship between lateral height $H_L$ and apex height $H_A$ is that the heat plate 150 may be enabled to seat comfortably against the workpiece such that the workpiece is received within the curvature of the heat plate 150, thereby enabling the user to easily move the heat press relative to the workpiece during use, according to various embodiments.

Figure 3:
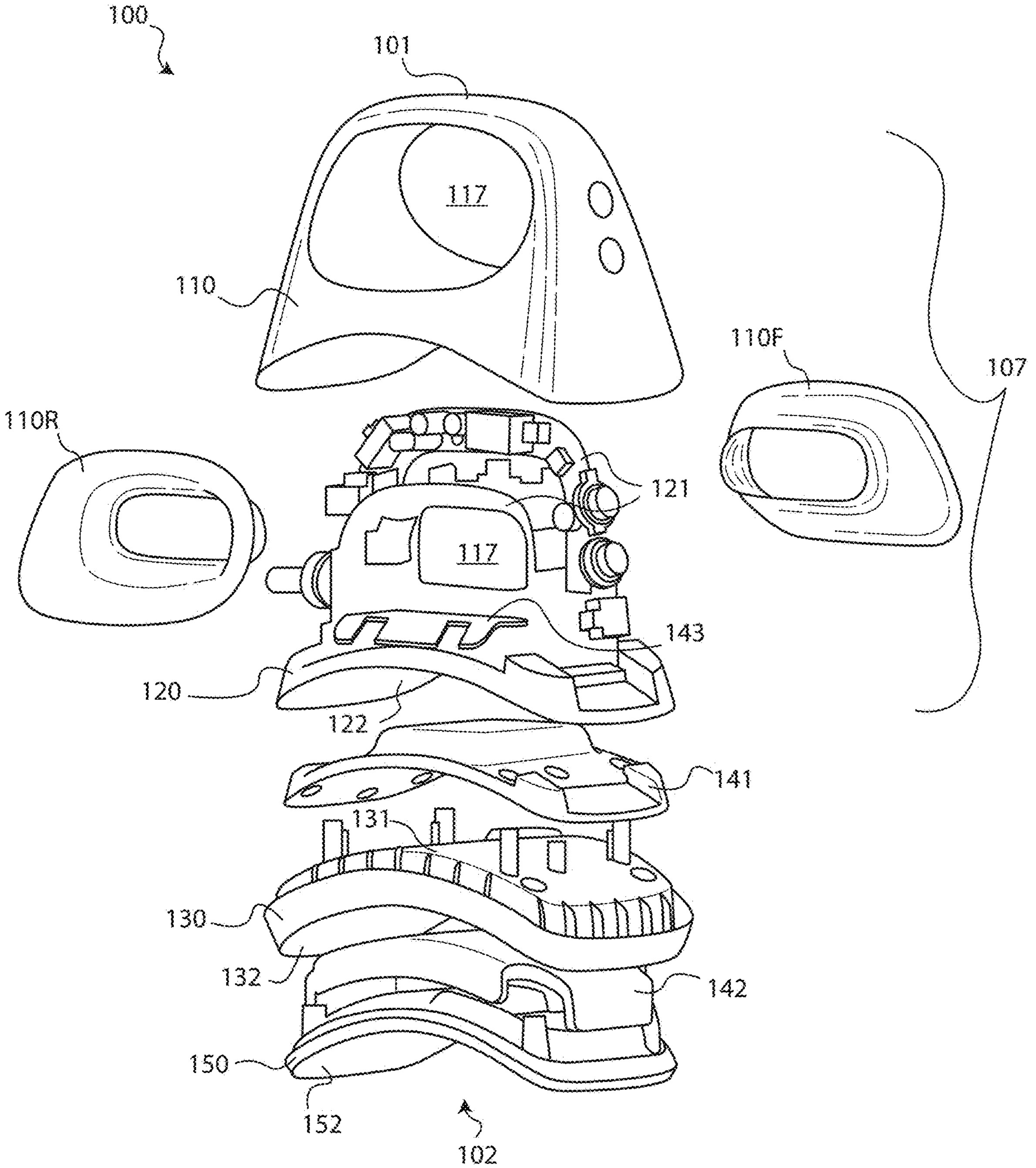
FIG. 3 is an exploded view of a heat press, in accordance with various embodiments.
Figure 4:
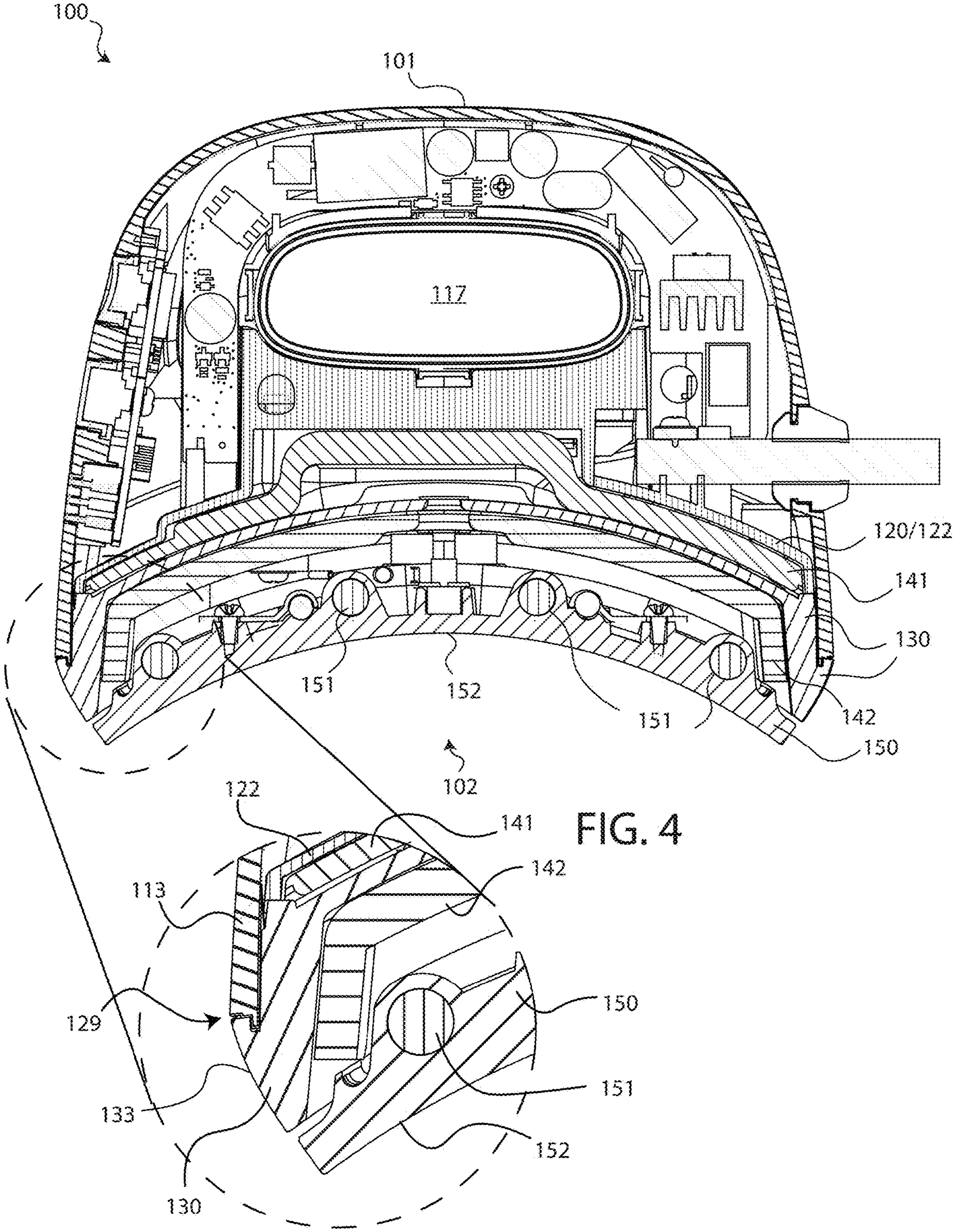
FIG. 4 is a cross-sectional front view of a heat press, in accordance with various embodiments.

Now turning to FIGS. 3 and 4, details pertaining to the internal structure and configuration of the heat press 100 are provided. The various internal features, layers, and components of the heat press 100 may each individually, collectively, or in any combination, be incorporated into or with the various embodiments of the heat press 100 described herein. The handle portion 107 of the heat press 100 may be generally comprised of the exterior housing 110 and an inner support structure 120. The exterior housing 110 may include front and rear sections 110R, 110L that define the surfaces that face the hand clearance opening 117. The exterior housing 110 may be coupled to the inner support structure 120. The inner support structure 120, as described in greater detail below, may comprise an upper segment 121 and a lower curved segment 122, and a plurality of electric and electronic components (such as circuit boards and other circuitry) may be coupled to the upper segment 121 and/or the lower curved segment 122 of the inner support structure. The upper segment 121 may extend around the hand clearance opening 117 while still being housed within the exterior housing 110.

According to various embodiments, the heat plate 150 is coupled to the inner support structure 120, for example, via the lower curved segment 122. In various embodiments, a skirt 130 may be disposed generally between the inner support structure 120 and the heat plate 150. Said differently, and as described in greater detail below, the inner support structure 120 may be directly mounted to the skirt 130 adjacent a first side 131 of the skirt 130 and the heat plate 150 may be directly mounted to the skirt 130 adjacent a second side 132 of the skirt 130 opposite the first side 131.

In various embodiments, one or more insulation layers may be disposed between the various components forming the internal stack-up of the heat press 100. For example, a first insulation layer 141 may be disposed between the inner support structure 120 (e.g., the lower curved segment 122 of the inner support structure 120) and the skirt 130 (e.g., the first side 131 of the skirt 130). In various embodiments, a second insulation layer 142 is disposed between the skirt 130 (e.g., the second side 132 of the skirt 130) and the heat plate 150. In various embodiments, the heat press 100 includes a third insulation layer 143 disposed between the lower curved segment 122 of the inner support structure 120 and the hand clearance opening 117. One or more of these insulation layers 141, 142, 143 may included in the heat press 100 in various combinations. For example, the heat press 100 may only include the first layer 141, may only include the second insulation layer 142, may only include the third insulation layer 143, or may include various combinations of the insulation various layers. In various embodiments the heat press 100 includes all three insulation layers 141, 142, 143.

With reference to FIG. 3, various components of the heat press 100 have been omitted from this exploded view to avoid obscuring the clarity of the depiction of the aforementioned structural and insulative layers. For example, the heat press 100 may include a plurality of fasteners for securing the inner support structure 120 to the skirt 130 and for securing the skirt 130 to the heat plate 150. In various embodiments, various components forming the internal stack-up of layers of the heat press 100 may have lower surfaces that have curved surfaces or other geometries that generally match and/or conform to the curved nature of the heat plate 150. For example, one or more (or all) of the following components may at least have a portion of at least a lower surface section that substantially matches the curvature of the curved engagement surface 152 of the heat plate 150: the lower curved segment 122 of the inner support structure 120, a lower surface of the first insulation layer 141, the second side 132 of the skirt 130, a lower surface of the second insulation layer 142. Structural integrity and/or heat insulation of the heat press 100 may be improved by having various components of the internal components with conforming/similar geometries.

In various embodiments, force from a user grasping the handle portion 107 is transferred to the heat plate 150 (and thus to the workpiece 12) via the skirt 130. Said differently, the skirt 130 may be a structural intermediary between the heat plate 150 and one or both of the exterior housing 110 and the inner support structure 120. For example, as mentioned above, fasteners, studs, bosses, or other attachment mechanisms for structurally coupling the heat plate 150 to the handle portion 107 may be directly affixed and/or engaged with the skirt 130. In various embodiments, and with specific reference to the magnified view of FIG. 4, peripheral edges of various structural components are disposed in direct abutting engagement with each other, or are at least disposed in close proximity with each other (e.g., directly adjacent) in order to facilitate secure retention of the various interposed layers (e.g., first and second insulation layers 141, 142). For example, a lower peripheral edge 113 of the exterior housing 110 may be engaged (e.g., directly) with a corresponding peripheral shoulder of the skirt 130 (i.e., at junction 129). This adjoining engagement between the skirt 130 and the exterior housing 110 may comprise an interference fit and/or may include other configurations for complementary engagement. This adjoining engagement at junction 129 may also provide various other benefits, such as facilitating retention of the internal components above the skirt 130, facilitating force transfer from the handle portion 107 to the heat plate 150 via the skirt 130, and/or providing parallel coupling structures for the heat press 100. Said differently, the exterior housing 110 may be affixed to the inner support structure 120 via one or more fasteners, the inner support structure 120 may be coupled to the skirt 130 via one or more fasteners, and the skirt 130 may also be coupled to the exterior housing 110 via the adjoining engagement at junction 129.

In various embodiments, and with continued reference to FIGS. 3 and 4, junction 129 may be the widest portion of the heat press 100. Said differently, the peripheral perimeter/footprint of the heat press 100 may have its largest dimension at junction 129. Accordingly, the lower peripheral edge 113 (FIG. 4) of the exterior housing 110 may have a diverging geometry, from the proximal end 101 to the distal end 102, up until the junction 129, at which location the exterior of the heat press 100 switches to have a converging geometry, from the proximal end 101 to the distal end 102. In such a configuration, the skirt 130 may comprise the converging geometry, and thus an outward perimeter surface 133 of the skirt 130 may form a converging band of the exterior body of the heat press 100. Said differently, although the skirt 130 may be primarily an internal structural component, the skirt 130 may include a section, such as the outward perimeter surface 133, that forms an outer surface section of the heat press 100 that is exposed to ambient air and/or the surrounding environment. This converging geometry may also continue to the lateral edges 152L of the heat plate 150.

In various embodiments, the heat press 100 includes a plurality of circuitry components, such as one or more printed circuit boards and related electric and electronic components. In some configurations, the circuitry and/or printed circuit board(s) are separated from the heat plate 150 by one or more of the insulation layers 141, 142, 143, thereby protecting electronic components situated on the printed circuit boards from heat during use of the heat press 100. The one or more printed circuit boards and other electric and/or electronic components may be situated within the exterior housing 110 and may be coupled and/or mounted to the exterior housing 110 and/or the inner support structure 120. In various instances, a first printed circuit board may include many of the power electronic components, such as, for example: power converters; amplifiers; rectifiers; and the like while a second printed circuit board may include electronic components configured to, for example, operate a controller in view of one or more user inputs resulting from actuating the one or more buttons 112 that may, in turn, change an on state or an off state of the one or more indicators 114, which may be, for example, a temperature indicator. The printed circuit board(s) may also include electronic components including, but not limited to: electrical switches; light emitting diode (LED) lights; and the like.

As described below, the heat press 100 may include processors, memory, one or more buttons, switches, and/or user interface components for actuating and controlling the heat press 100. However, in various embodiments the heat press 100 is configured to be controlled, at least partially (and potentially completely) via a remote computing device connected in control communication with the heat press 100 (via a wired or wireless connection).

In various embodiments, the structural components of the heat press 100 (e.g., the exterior housing 110, the inner support structure 120, and the skirt 130) may be made from plastic materials, such as a polyphenylene sulfide (PPS) material. In other instances, the structural components of the heat press 100 may include one or more other durable, insulating materials, such as, for example, a polypropylene carbonate (PPC) and/or a glass fiber insulation material, or a combination thereof.

With continued reference to FIGS. 3 and 4, an upper portion of the heat plate 150 may be disposed adjacent and contained by the second insulation layer 142, with an upper portion of the second insulation layer 142 being contained by the skirt 130. In some configurations, the second insulation layer 142 includes a heat insulating material configured to mitigate heat transfer from the heat plate 150 toward the handle portion 107 of the heat press 100. In various embodiments, the insulative layers of the heat press 100, such as the first and second insulation layer 141, 142, 143 include fibrous insulative materials, including but not limited to: nylon with glass fibers, a microporous fiber insulation material, an aerogel, or the like, or combinations thereof. At least one aspect of the separate insulation layers defined by, for example, the first insulation layer 141 and the second insulation layer 142 provide softer materials that may have more effective insulating properties than the other rigid/structural components described herein. In various embodiments, the heat press 100 includes an alternating layup of structural and insulative material layers. Said differently, softer insulation layers 141, 142, 143 can insulate the electronic components and the handle portion 107 from heat without needing to absorb any forces from the user that are translated/propagated from the handle portion 107 to the heat plate 150 and thus to the workpiece. In various embodiments, the third insulation layer 143 is a metallic component, and is specifically configured to reflect heat radiation away from the hand clearance opening 117.

In various embodiments, the insulation layers maintain the exterior housing 110 and components therein at less than or equal to about 50° C. when a temperature of the heat plate 150 is equal to or greater than about 200° C. In various configurations, the insulation layers 141, 142, 143 maintain the exterior housing 110 and components therein equal to about 50° C. when a temperature of the heat plate 150 is equal to about 205° C.

In various embodiments, the heat plate 150 may include any desirable base material (e.g., a metallic material), and, optionally, a ceramic coating that may prevent material (e.g., one or a combination of the heat-activated design implement and the workpiece) from sticking to heat plate 150 during use. Additionally, in some embodiments, the heat plate 150 may further optionally include a clear protective coating that mitigates failure of and/or prevents the ceramic coating from structurally degrading and separating from the heat plate 150.

In various embodiments, and with specific reference to FIG. 4, the heat plate 150 may include one or more heating coils 151 electrically coupled to, and/or communicatively coupled to a controller comprising temperature control electronics. As mentioned above and below, the controller may be a component of printed circuit boards of the heat press 100 and/or may be a component of a computing device that is coupled in control communication with the heat press 100.

Figure 5:
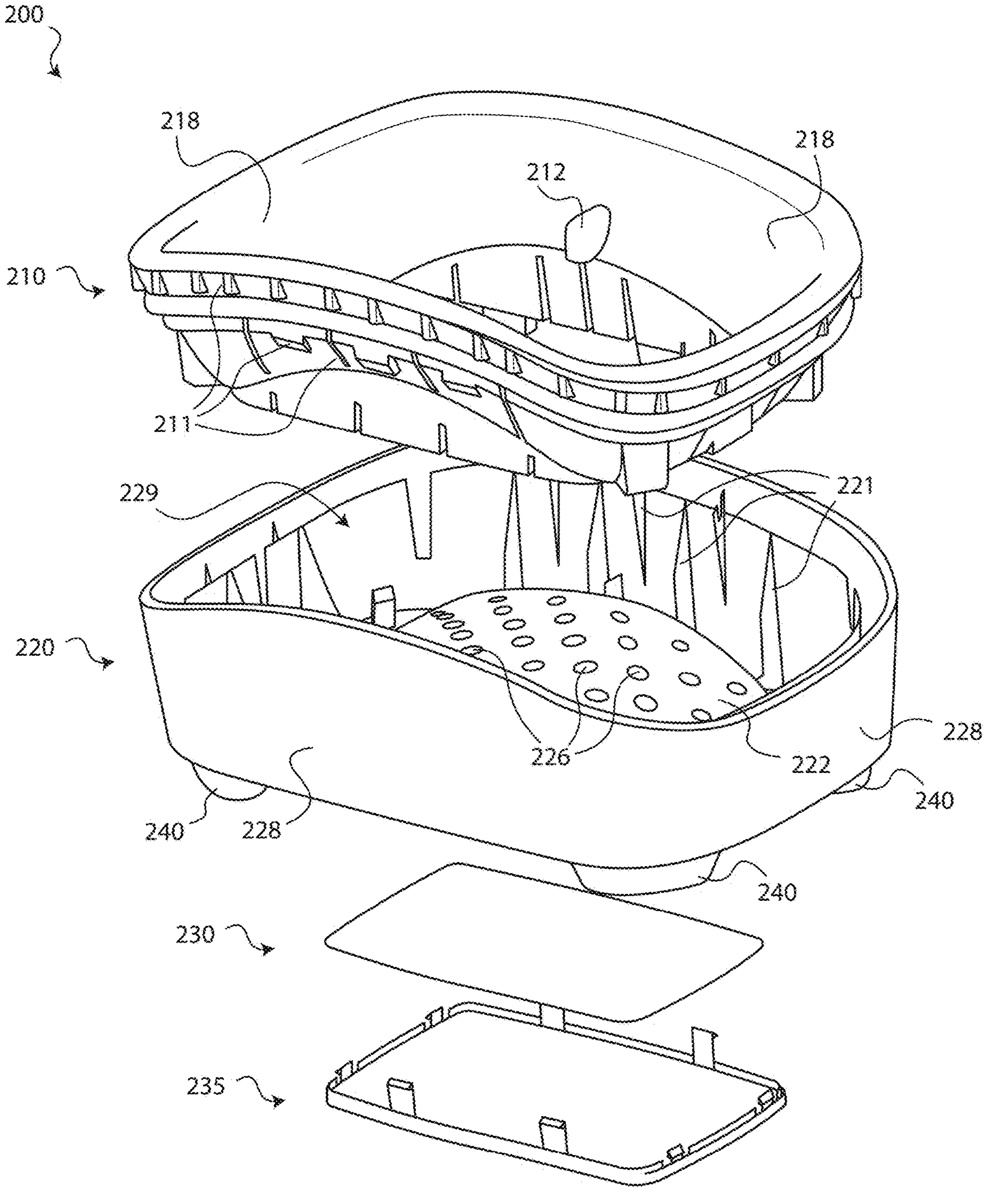
FIG. 5 is an exploded view of a heat press stand, in accordance with various embodiments.
Figure 6:
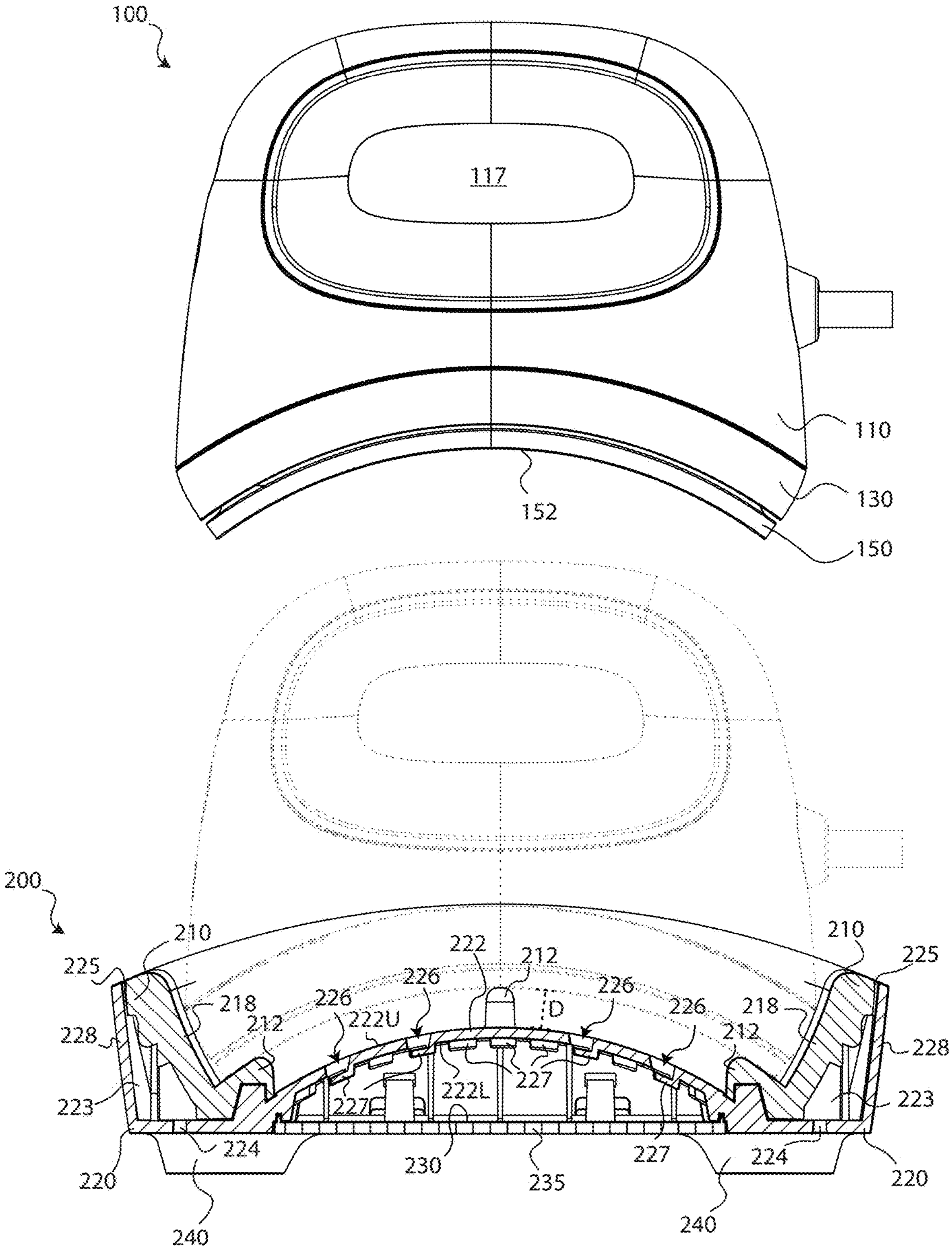
FIG. 6 is a cross-sectional front view of a heat press stand and a front view of a heat press removed a distance from the heat press stand, in accordance with various embodiments.
Figure 7:
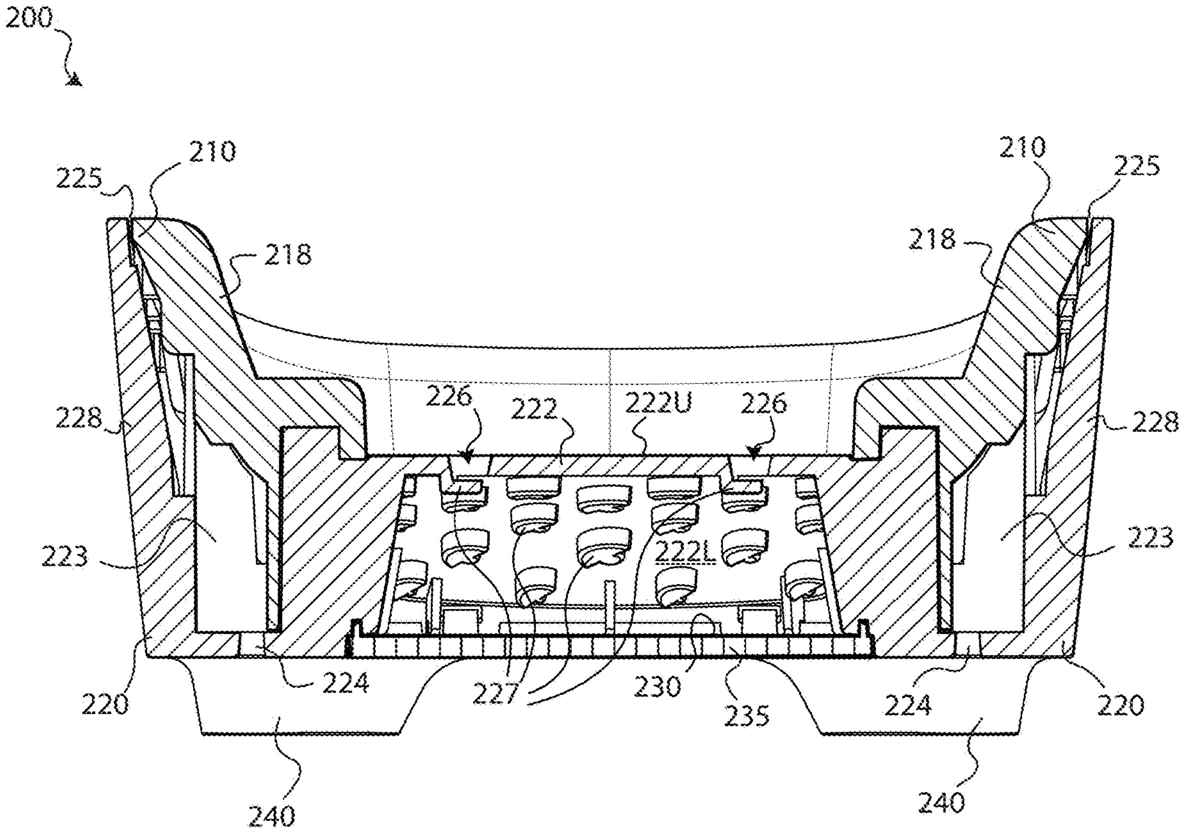
FIG. 7 is a cross-sectional side view of heat press stand, in accordance with various embodiments.
Figure 8:
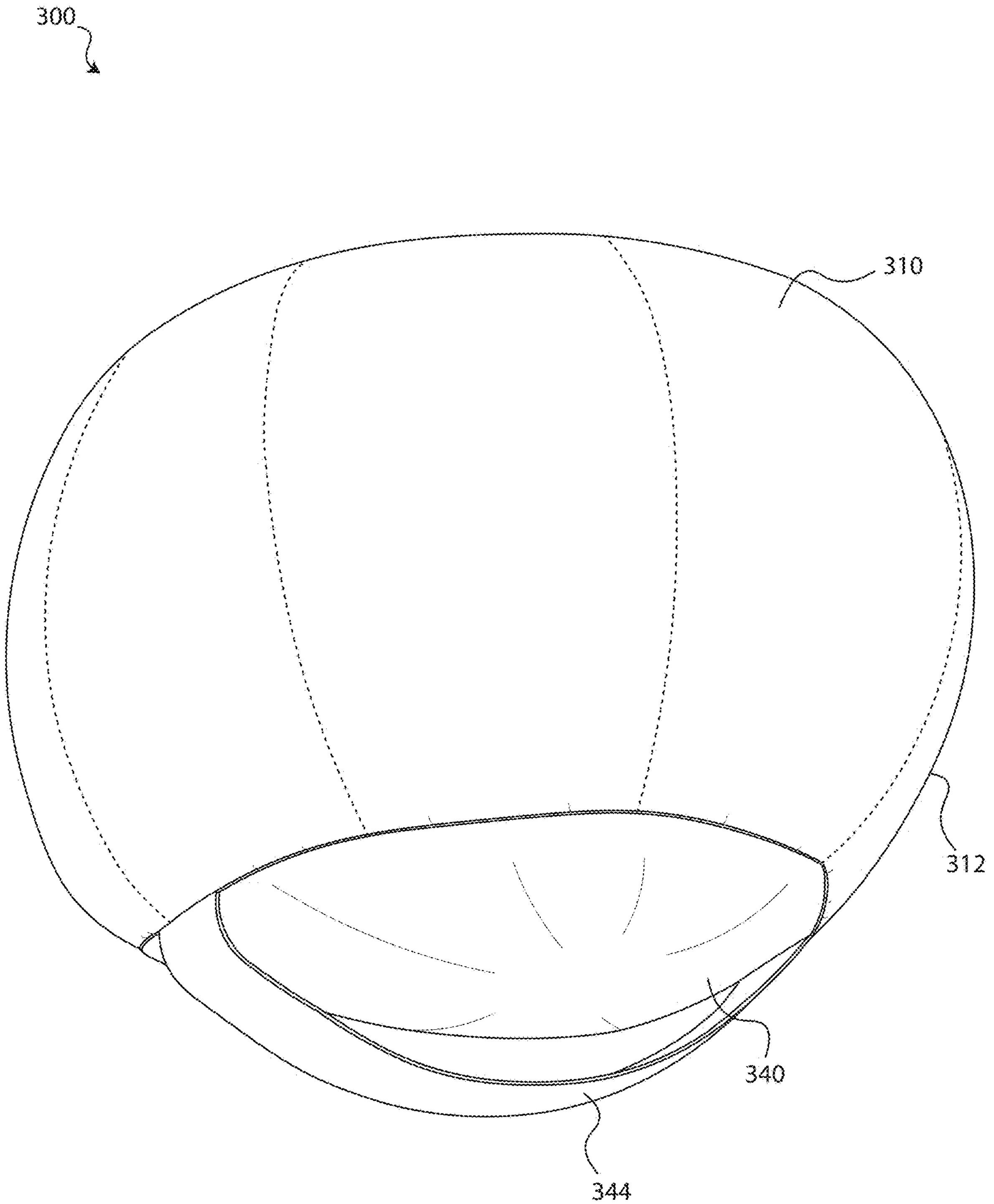
FIG. 8 is a perspective view of a hat form of a heat press system, in accordance with various embodiments.
Figure 9A:
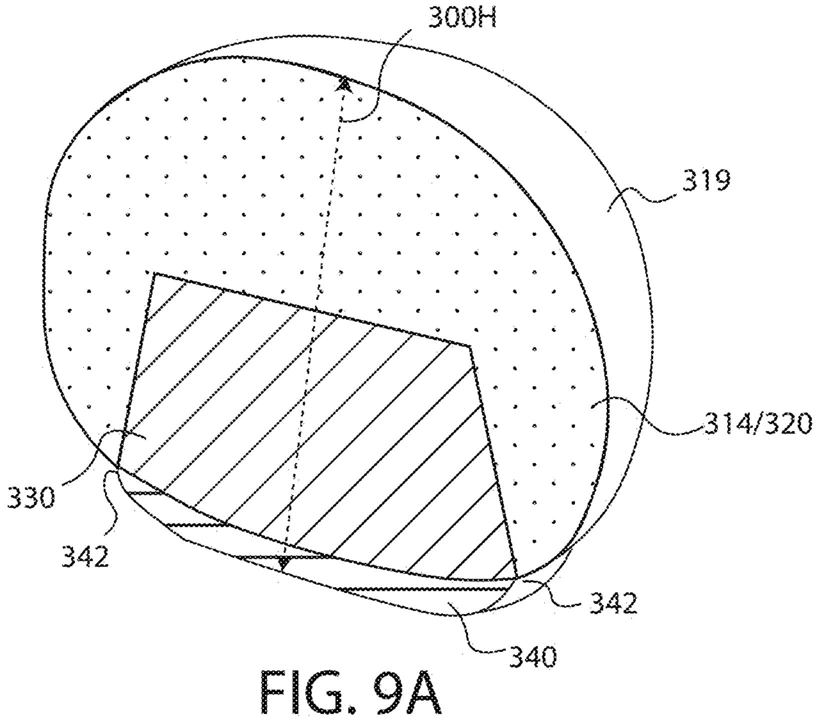
FIG. 9A is a schematic cross-sectional view of a hat form of a heat press system, in accordance with various embodiments.
Figure 9B:
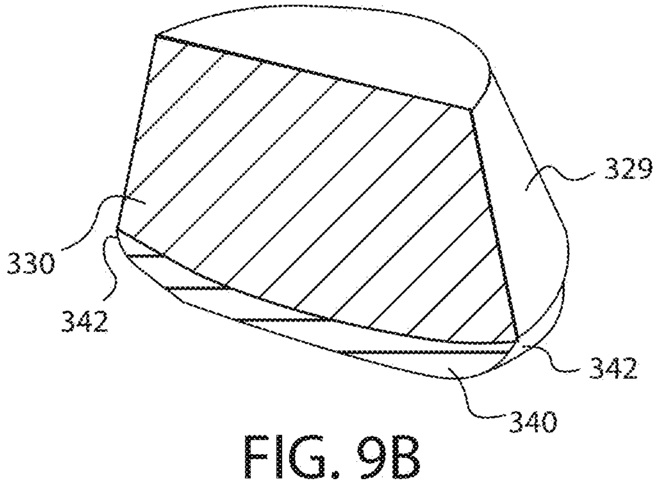
FIG. 9B is a schematic cross-sectional view of various components of the hat form of FIG. 9A, in accordance with various embodiments.
Figure 9C:
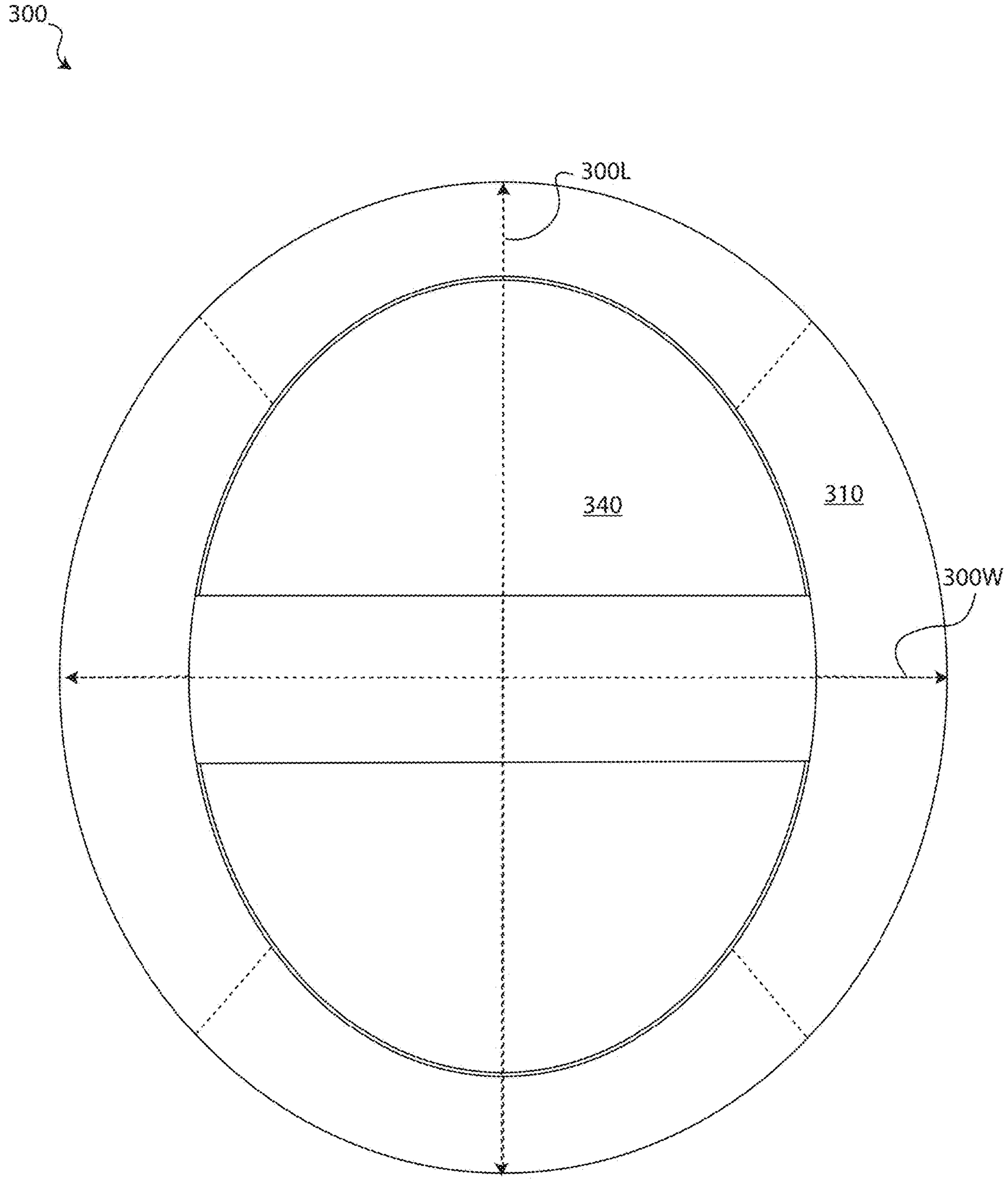
FIG. 9C is a lower/bottom view of the hat form of FIG. 8, in accordance with various embodiments.

FIGS. 5-7 illustrate various details, components, and features of a heat press stand 200, according to various embodiments. More specifically, FIG. 5 illustrates an exploded view of the various components of the heat press stand 200, FIG. 6 illustrates a front cross-sectional view of the heat press stand 200, showing a solid line depiction of the heat press 100 removed a distance from heat press stand 200 and also showing an opaque dashed line depiction of the heat press 100 in a docked position. FIG. 7 illustrates a side cross-sectional view of the heat press stand 200. The heat press stand 200, which also may be referred to as a docking station or a base, is generally configured to support the heat press 100 when not being actively used to perform a heat-activated process on a workpiece. Said differently, a user may use the heat press stand 200 to periodically set the heat press 100 down without turning the power off or without needing to wait for the heat plate 150 to cool. Accordingly, the heat press stand 200 may provide a barrier between the curved engagement surface 152 of the heat plate 150 and a support surface or working surface, such as a counter, a table, a desktop surface, or the like. Accordingly, the heat press stand 200 may comprise one or more insulating materials, such as, for example: a rubber material, a silicone material, a plastic material, etc., which can withstand hot temperatures of the heat plate 150 while keeping the heat press 100 arranged at a distance away from the working surface that supports the heat press stand 200. In some configurations, the heat press stand 200 may include a polyphenylene sulfide (PPS) material, a silicone material, a plastic materials, a rubber material, or any combination thereof.

In some examples, the heat press stand 200 can withstand instances of the heat plate 150 being heated to a temperature as high as, for example, 180° C. or more while maintaining the temperature of the working surface at or below 90° C. In some configurations, the heat press stand 200 can withstand instances of the heat plate 150 being heated to a temperature as high as, for example, 200° C. or more while maintaining the temperature of the working surface at or below 70° C.

With continued reference to FIGS. 5, 6, and 7, the heat press stand 200 may include a curved floor 222 that is configured to be disposed below the heat plate 150 when the heat press 100 is stowed on the heat press stand 200. Accordingly, the curved floor 222 may comprise an upper convex surface 222U and a lower concave surface 222L. In various embodiments, at least a portion of the curved floor 222 has a uniform/constant thickness. For example, the portion of the curved floor 222 that underlies the curved heat plate 150 may have a substantially uniform/constant cross-sectional thickness, where 'thickness' is defined as the dimension between the upper convex surface and the opposing/lower concave surface of the curved floor 222. As used in this context, term "substantially uniform" refers to a thickness that changes less than 5% over the indicated portion of the curved floor 222.

In various embodiments, the curved floor 222 (e.g., the upper convex surface 222U) is curved about a single axis of curvature. That is, similar to the various embodiments mentioned above pertaining to the curvature of the heat plate 150 of the heat press 100, lines extending across and along the curved floor 222 from one lateral side to the other lateral side of the heat press stand 200 (e.g., from left to right in the depiction of FIG. 6) may be curved whereas lines extending across and along the curved floor 222 from the front side toward the back side of the heat press stand 200 (e.g., from left to right in the depiction of FIG. 7) may be substantially straight, having no curvature, according to various embodiments. In various embodiments, the center/axis of curvature of the curved floor 222 is below a lower most portion of the heat press stand 200 (i.e., lies within or below the support surface upon which the heat press stand 200 rests). The curved floor 222 may generally have curvature specifications that substantially match the curvature specifications of the heat plate 150 (i.e., the curved engagement surface 152 of the heat plate 150). Said differently, at least a portion of the curved floor 222 may have a radius of curvature that is the same as the radius of curvature 153 of the curved engagement surface 152 of the heat plate 150 of the heat press 100.

In various embodiments, the curved floor 222 of the heat press stand 200 defines one or more perforations 226 extending through the curved floor 222 (i.e., from the upper convex surface to the lower concave surface). The perforations 226 may promote ambient air flow through the heat press stand 200 such that ambient air may dissipate heat from the heat plate 150. In various embodiments, the curved floor 222 includes a plurality of louvres 227, and each louvre may extend from the lower concave surface 222L of the curved floor 222 and at least partially across a lower opening of a respective perforation of the plurality of perforations 226. For example, one, multiple, or all of the perforations 226 that extend through the curved floor 222 may have a slat, flange, extension, tab, or other protrusion that extends from adjacent a lower opening of the perforations and partially covers the lower opening of the perforations, and this slat, flange, extension, or tab is referred to herein as a louvre 227. The one or more louvres 227 may reflect heat radiation, may direct the convective (passive) airflow, and/or may provide various other benefits, such as blocking direct line of sight to the components, features, and/or layers below the curved floor 222 (such as the heat shield 230, as discussed below).

In various embodiments, the heat press stand 200 includes one or more heat plate support protrusions 212 that are configured to directly abut/support the curved engagement surface 152 of the heat plate 150 when the heat press 100 is seated/stowed within/on the heat press stand 200 (i.e., when the heat press 100 is in the docked position). The plurality of heat plate support protrusions 212 may be disposed adjacent the upper convex surface of the curved floor 222 and may be configured to support the heat plate 150 away from the curved floor 222 at a distance D (FIG. 6). Although the illustrated embodiments of the heat press stand 200 includes four heat plate support protrusions 212 (e.g., see FIG. 1A), other implementations of the heat press stand may include more or less than four heat plate support protrusions 212 (e.g., three, five, six, seven, or 8+).

In various embodiments, the heat plate support protrusions 212 are formed from one or more heat insulating materials that can withstand high temperatures from the heat plate 150. In addition, the heat plate support protrusions 212 may include a smooth and/or flexible material that mitigates impairment of the structural integrity of the curved engagement surface 152 of the heat plate 150 when the heat plate 150 is placed thereon. In some examples, one or more heat plate support protrusions 212 may include a silicon material. In some configurations, the one or more heat plate support protrusions 212 are configured to extend at least partially over an adjacent section of the curved floor 222. In various embodiments, the heat plate support protrusions 212 may be disposed at a midpoint of respective edges of the perimeter/footprint of the curved floor 222. That is, curved floor 222 may generally have a perimeter/footprint having four sides (a front side, a back/rear side, and two lateral sides), and a single heat plate support protrusion 212 may be disposed at a midpoint on each of the four sides of the perimeter of the curved floor 222 (see, for example, FIG. 1A). By disposing the heat plate support protrusions 212 at the midpoint of the respective edges, heat dissipation from the heat plate 150 may be facilitated, as convective heat would not be trapped in the corners of the footprint of the curved floor (as may be the case if the support protrusions were placed in the respective corners of the footprint).

In various embodiments, the heat press stand 200 includes a main body 220, and the main body 220 may include the curved floor 222 as well as body walls 228 that extend generally upwards around the curved floor 222 (i.e., from the footprint/perimeter of the curved floor 222). These body walls 228 may define a nest region 229 (FIG. 5). The heat press stand 200 may also include an insert 210, and the insert 210 may be matingly-received within the nest region 229 defined by the body walls 228 of the main body 220. In various embodiments, the plurality of heat plate support protrusions 212 are features of the insert 210. That is, the plurality of heat plate support protrusions 212 may not be integrally formed with the curved floor 222, but instead may be features of a separate/distinct layer/component of the heat press stand 200. The insert 210 may be made from materials that are able to withstand direct contact with the heat plate 150 (e.g., a silicone material), whereas the main body 220 may not necessarily be configured for intentional and/or prolonged direct contact with the heat plate 150. For example, the main body 220 may be made from a glass-filled nylon material, a PPS material, or the like.

In various embodiments, the insert 210 includes walls 218 extending upwards around the curved floor 222 of the main body 220. Accordingly, the walls 218 of the insert 210 may be at least partially contained within the nest region 229 defined by the body walls 228 of the main body 220. In various embodiments, outer surfaces of the walls 218 of the insert 210 may have first alignment features 211 (FIG. 5) that are configured to engage/couple with corresponding second alignment features 221 (FIG. 5) disposed on the inner surfaces of the body walls 228 of the main body 220. Said differently, corresponding sets of alignment/coupling features on facing surfaces of the insert 210 and the main body 220 may facilitate secure coupling of the insert 210 to the main body 220.

In various embodiments, one or more legs 240 may extend from a lower surface of the heat press stand 200 (e.g., from the main body 220). Functionally, the one or more legs 240 may separate the lower surface of the main body 220 from the underlying surface (e.g., the tabletop or desktop), The separation distance provided by the one or more legs 240 may promote ambient airflow through any perforations 226 in the curved floor 222. In some configurations, the one or more legs 240 are purposefully not axially aligned with the heat plate support protrusions 212 so that the heat plate support protrusions 212 are not disposed directly above the one or more legs 240. In such embodiments, heat that is transferred from the heat plate 150 into the heat plate support protrusions 212 does not transfer directly and axially through a respective leg of the plurality of legs 240 and into the supporting surface. Rather, in such a non-axially-aligned configuration, any heat transferred from the heat plate 150 into the heat plate support protrusions 212 is more likely to be radially transferred across and/or into the curved floor 222 before being axially exposed to the one or more legs 58, thus further dissipating heat before it can be thermally transferred toward the working surface via the one or more legs 240.

In addition, the various components of heat press stand 200 described herein, including, for example, the insert 210 and/or the main body 220 may be formed separately and joined together during manufacturing, or, alternatively, they may be integrally formed, such as by molding or by another process. For example, in some configurations, the heat plate support protrusions may be integrally formed with the curved floor and then joined with separate components such as, for example, peripheral body shell portions. Also, for example, the heat plate support protrusions and one or more legs may be formed separately from the rest of heat press stand 200 and subsequently joined together during manufacturing.

In various embodiments, the heat press stand 200 includes a heat shield 230 disposed below the curved floor 222. The heat shield 230 may be spaced away from the lower concave surface 222L of the curved floor 222, and thus an air gap may be defined between the lower concave surface 222L of the curved floor 222 and the heat shield 230. The heat shield 230, according to various embodiments, comprises a planar body disposed against a floor of the main body 220. In various embodiments, at least a portion of the floor of the main body 220 below the curved floor 222 comprises a shelf 235 for supporting the heat shield 230. The shelf 235 may be detachably coupled to the main body 220 of the heat press stand 200. The heat shield 230 may be adhesively attached to the shelf 235. The heat shield 230 may comprise a foil material configured to reflect heat radiation. For example, the heat shield 230 may comprise a metallic foil material, such as aluminum foil. In various embodiments, the heat shield 230 comprises an insulative layer/material configured to prevent or at least inhibit heat transfer to the support surface upon which the heat press stand 200 is positioned.

In various embodiments, the heat press stand 200 comprises spaces and/or air gaps defined between various sections of the heat press stand 200. For example, inwardly facing surfaces of the body walls 228 of the main body 220 and outwardly facing surfaces of the walls 218 of the insert 210 may collectively define one or more interwall cavities 223. The one or more interwall cavities 223 may insulate heat radiating radially outwardly from the heat plate 150. For example, the one or more interwall cavities 223 may be filled with a gas, such as, for example, air, or may comprise a vacuum for enhanced insulation capabilities. In various embodiments, the heat press stand 200 includes/defines a single interwall cavity that continuously extends around the periphery of the insert 210 (e.g., with alignment features 211, 221 variously dispersed throughout the interwall cavity 223). In other implementations, the heat press stand 200 defines a plurality of separate interwall cavities.

In various embodiments, the one or more interwall cavities 223 may facilitate the passive convective dissipation of heat away from the heat press stand 200. For example, one or more inlets 224 may be defined in the bottom/lower surface of the main body 220 through which ambient air may be drawn in response to heat transferring from the heat plate 150 to the insert 210 (and thus walls 218). Correspondingly, one or more outlets may be defined by at least one of the insert 210 and the main body 220 through which air in the interwall cavity can exit the one or more interwall cavities 223. For example, one or more channels or slits 225 may be defined between upper portions of the walls 218 of the insert 210 and respective upper portions of the body walls 228 of the main body 220, and the one or more channels or slits 225 may be configured to allow air within the one or more interwall cavities 223 to exit the heat press stand 200. Thus, a passive, cooling, convective air circulation may be facilitated via the one or more inlets 224, the one or more interwall cavities 223, and the one or more slits 225.

In various embodiments, channel(s) or slit(s) 225 may be configured to direct the air in the one or more interwall cavities 223 outward and away from the heat press 100 in the docking position relative to the heat press stand 200. Said differently, the angle of the walls 218 and the body walls 228 (or at least the respective upper portions thereof that directly form/define the slit(s) 225) may be outwardly angled to direct the convective air away from the heat press 100 docked in the heat press stand 200. For example, in various embodiments the body walls 228 of the main body 220 are angled outward, relative to a vertical direction. The walls 218 of the insert 210 may also be angled outward, relative to a vertical direction. In various embodiments, the general incline angle of the walls 218 of the insert 210, relative to vertical, is greater than the general incline angle of the body walls 228 of the main body 220. In such configurations, the respective upper portions of the walls 218 and the body walls 228 may form a pinch point at the slit(s) 225 that may generally produce a nozzle/venturi effect. Accordingly, the slit(s) 225 may be configured to produce a passive jet of air exiting the heat press stand 200.

In various embodiments, and with reference to FIGS. 8, 9A, 9B, and 9C, details and descriptions for a hat form 300 are provided. The hat form 300, as mentioned above, is configured to generally provide structure against which a workpiece 12 can be supported during a heat-activated design transfer process, according to various embodiments. For example, the hat form 300 may be generally sized and shaped such that a user may temporarily position a hat or a visor around the hat form 300, and the hat form 300 may provide the backing support necessary for the user to manually press the heat press 100 against an outer surface of the hat or visor (compressing the hat or visor between the heat press 100 and the hat form 300) in order to accomplish a heat-activated design transfer from a heat-activated design implement 14 to the hat or visor. As mentioned above, while numerous details are included herein pertaining to a form specifically designed for hat-type workpieces, the scope of the present disclosure is not necessarily limited to hats, and thus details and embodiments of the hat form 300 may be utilized for shoe forms, ball forms, or other non-planar forms for processing non-planar workpieces. Said differently, the following details described in relation to the hat form 300 may be applied to other forms, and thus other types of forms fall within the scope of the present disclosure.

Generally, the hat form 300, which may be a standalone component and/or which may be a component of a hat press system, comprises a cover 310 that at least partially defines an internal volume 314 of the hat form 300, according to various embodiments. The hat form 300 may also include a fill material 320 disposed within and at least partially occupying the internal volume 314. The hat form 300 may generally have a spherical shape or an elongated spherical shape. Said differently, the radially outward surface(s) of the hat form 300 are convex, according to various embodiments. The hat form 300 may have an oblong spherical shape (not a symmetrical spherical shape) in order to provide different contours of curvature, thereby enabling the hat form 300 to be used with different sizes and shapes of workpieces. For example, and with reference to FIG. 9C, the hat form may have a length 300L (larger dimension) by width (smaller dimension) 300 W that is about 7.5 inches (190 millimeters) by 6.5 inches (165 inches). As used in this context only, the term "about" means plus or minus 2.0 inches. The width 300 W may be between about 75% and about 95% of the length 300L. In various embodiments, the width 300 W of the hat form 300 is between about 80% and about 90% of the length 300L. In various embodiments, the width 300 W is about 86% of the length 300L. As used in this context only, the term "about" means plus or minus 2%. In various embodiments, height 300H (FIG. 9A) of the hat form 300 is less than each of the width 300 W and the length 300L. For example, the height 300H of the hat form 300 may be about 5.1 inches (130 millimeters). As used in this context only, the term "about" means plus or minus 1.0 inch.

The cover 310 may be a fabric or other textile material, and the fill material 320 may be a granular material, and thus the hat form 300 may be configured to be resiliently flexible and/or to be resiliently moldable. Said differently, the hat form 300 may have sufficient structure to provide backing support during a heat press operation but may also have a degree of resilient pliability to allow the user to slightly deform and/or slightly alter the shape of the hat form 300 in order to conform the outer surface of the hat form 300 to work with multiple different types and shapes of headwear.

In various embodiments, the fill material 320 comprises a granular material. That is, the fill material may be a conglomeration of discrete, solid, macroscopic particles. For example, the fill material 320 may include synthetic and/or organic particles. For example, the fill material 320 may include a conglomeration of foam fragments, felt fragments, padding, beads (e.g., silica beads, polystyrene beads), sand, wood-shavings, buckwheat holes, silica powder, and/or organic matter shells (e.g., shells from at least one of nuts, drupes, and/or legumes), among other materials. In various embodiments, the fill material 320 may be a conglomeration of walnut shells, which provide a sufficient degree of structure to enable an effective heat-activated design transfer while also providing sufficient conformability/pliability and heat insulation.

In various embodiments, the cover 310 comprises a heat resistant fabric material. For example, the cover 310 may be a cotton material. In various embodiments, the cover 310 may include infused layers of metal material and/or a metallic coating (e.g., aluminum coating), and this metal material may facilitate heat transfer across the surface of the cover 310, thereby improving heat distribution and enabling even heating across the selected area of the workpiece. The metallic material (e.g., the metallic coating) may also facilitate heat reflectance, thereby helping heat that has passed through the heat-activated design implement and through the workpiece to be reflected back toward the heat press. In various embodiments, the cover 310 may be configured to wick moisture away from the workpiece, and thus a fabric or textile material may be well-suited for the material of the cover 310, as opposed to silicone or other materials for the cover. In various embodiments, the cover 310 may include a multi-layered structure, and thus the cover 310 may include a liner layer 319 disposed inward of the outer cover material. The liner layer 319 may facilitate retention of the fill material (e.g., the granular fill material) and/or the liner layer 319 may be specifically configured to wick away moisture from the outer cover material. For example, the liner layer 319 may be a felt material. In various embodiments, the cover 310 includes a plurality of sections of fabric material that are sewn together.

In various embodiments, the hat form 300 includes a base 340. The base 340 may be made of a material that is different than the cover 310 and may be specifically configured to provide a lower support for the hat form 300. For example, the base 340 may be made from a polyester fabric other similar material and may be configured to be directly handled by a user, whereas the cover 310 may be configured as the working surface of the hat from 310. Stated differently, the cover 310 may be optimized for directly engaging and contacting the workpiece and for handling the heat and/or moisture that are generated during use, while the base 340 may be configured and optimized for user handling comfort. For example, the base 340 may comprise a handle 344 that a user may grasp during a heat-activated design transfer process, thus enabling the hat form 300 to be easily manipulated independent and separate from the heat press 100 (thus allowing both the heat press 100 and the workpiece/hat form 300 to be independently, separately, and/or simultaneously moved during use).

The base 340 may also include an outer periphery/perimeter 342, and the cover 310 may be coupled to the base 340 at/along the perimeter 342. Thus, the cover 310 and the base 340 may collectively define the internal volume 314 of the hat form 300. Said differently, the fill material 320 may be held within the internal volume 314 between the cover 310 and the base 340. As shown in the figures, the base 340 may comprise a comparatively small portion of the outer surface area of the hat form 300. That is, the base 340 may comprise less than 50% of the outer surface area of the hat form 300. In various embodiments, the base 340 comprises less than 30% of the outer surface area of the hat from 300. Regarding the radially outward surface of the hat form 300, the radially outward surface of the base 340 may be less curved than the radially outward surface of the cover 310. Said differently, the radially outward surface of the base 340 may only be slightly convex or may be nearly planar, whereas the radially outward surface of the cover 310 has spherical curvature. The radially inward surface of the base 340 (i.e., the surface facing the fill material 320) may have a liner configured to facilitate retention of the fill material within the internal volume 314.

In various embodiments, the hat form 300 includes a support body 330 extending from the base 340 (e.g., from the radially inward surface of the base 340) into the internal volume 314 of the hat form 300. The support body 330 may provide an added degree of structure to the hat form 300. The support body 330 may have a higher density than the fill material 320 and may thus disproportionally add weight to the lower portion of the hat form 300 adjacent the base 340, thereby facilitating proper orientation/use of the hat form 300. For example, while the hat form 300 may be manipulated and moved during use of the heat press 100 against the hat form 300 (via the workpiece), the hat form 300 may also rest on a table or other support surface during use, and the added weight and/or structure of the support body 330 may facilitate stability of the hat form 300 during use. In various embodiments, the support body 330 may comprise a felt material. In various embodiments, a liner layer 329 may be disposed around the support body 330 to separate the support body 330 from the fill material 320. The liner layer 329, according to various embodiments, may be a heat resistant material (similar to the material of the cover 310), and may be configured to prevent excess heat from reaching the support body 330.

In various embodiments, the support body 330 has a frustoconical shape. For example, a base of the conical shape may be coupled to the base 340 of the hat form 300 while the tapering/converging portion of the conical shape may extend into the internal volume 314 of the hat form 300. In various embodiments, the base of the conical shape of the support body 330 has a perimeter that substantially matches the perimeter of the base 340 of the hat form 300. In various embodiments, the support body 330 occupies less volume within the hat form 300 than the fill material 320. For example, the fill material 320 may occupy more than 50% of the internal volume and the support body 330 may occupy less than 50% of the internal volume of the hat form 300. In various embodiments, a volume ratio of the fill material 320 to the support body 330 in the internal volume 314 is between 1:1 and 4:1. In various embodiments, the volume ratio of the fill material 320 to the support body 330 is between 1.5:1 and 3:1.

In various embodiments, and with reference to FIGS. 10A, 10B, 10C, and 10D, a method of using a heat press system is provided. As mentioned above, a heat press system may include combinations of a heat press, a heat press stand, and a form (e.g., a hat form). While specific examples of the various method steps are shown in FIGS. 10A, 10B, 10C, and 10D with reference to the embodiments depicted in earlier figures, it is expected that the disclosed method steps may be achieved using components that are similar to the aforementioned components but are not the same. That is, for example, by using reference numbers 100 and 300 for a heat press and a hat form, the aforementioned embodiments of those structures are utilized as examples of what may be employed in the method, but the method is NOT limited for use with only those structures.

In various embodiments, a method of using a heat press system includes positioning a workpiece 12 around a form, such as hat form 300. If the workpiece 12 is a hat, the step of positioning the workpiece 12 around the form may include pulling back and/or removing any protective inserts or other layers that may be disposed within the head cavity of the hat. By so doing, the hat form may be configured to be directly opposite the layer of material onto which a heat-activated design implement 14 is to be transferred.

Figure 10A:
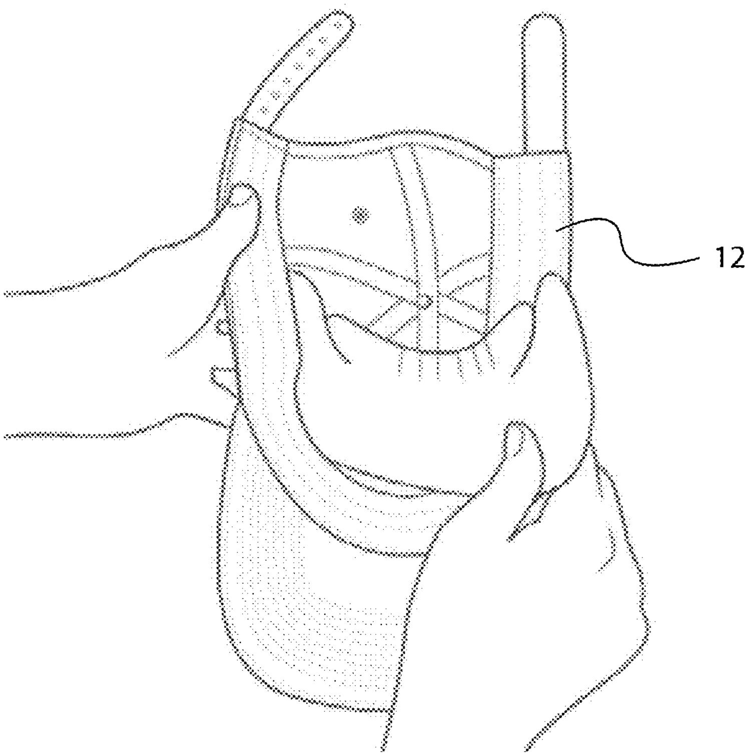
FIGS. 10A, 10B, 10C, and 10D show various views of a method of using a heat press system, in accordance with various embodiments.
Figure 10B:
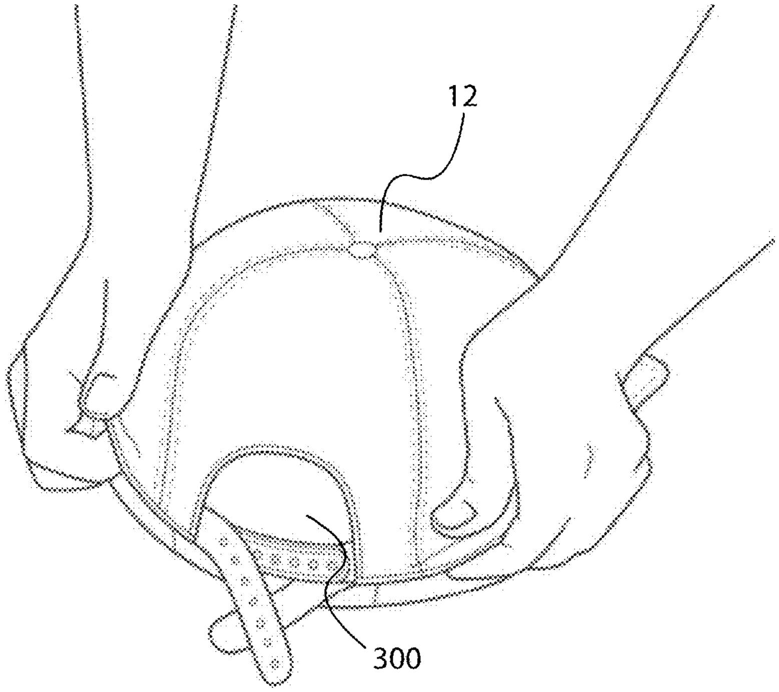
Figure 10C:
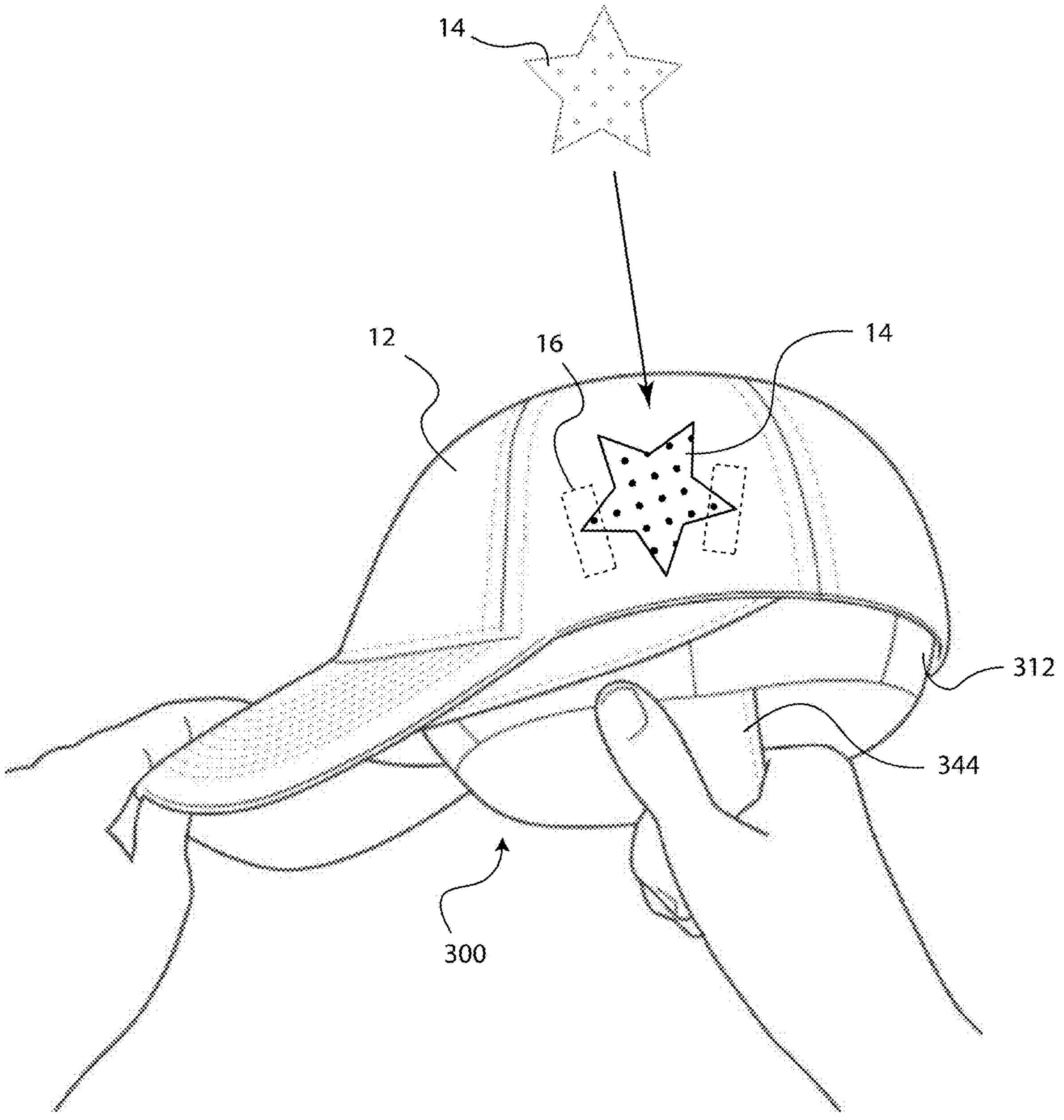
Figure 10D:
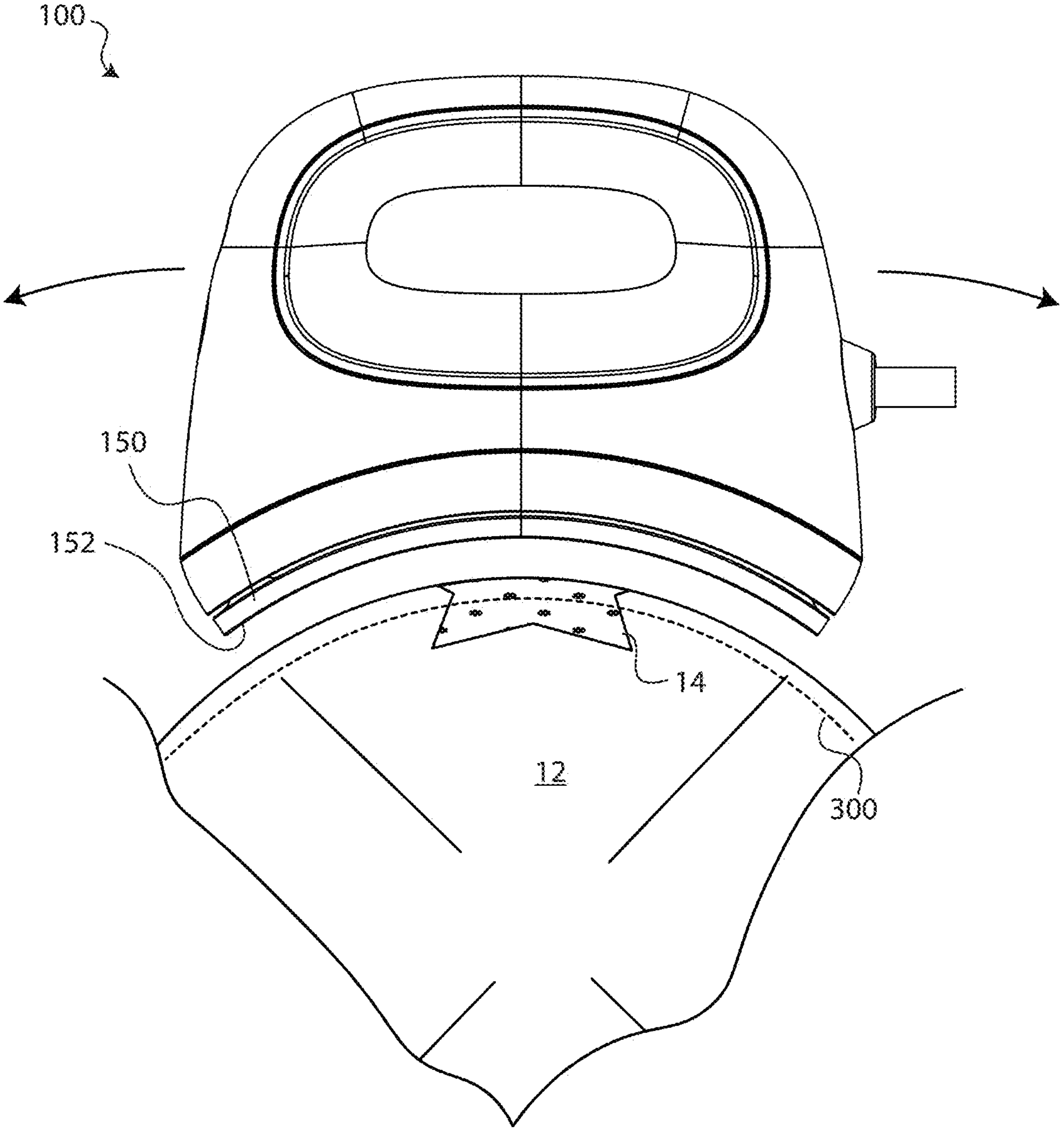

The method of using a heat press system may further include grasping handle 344 or other feature of a hat form 300 to enable the user to adjust the position of the workpiece 12 relative to the hat form 300. The method may also include positioning a heat-activated design implement 14 to a surface of the workpiece 12 (e.g., a convex surface of the workpiece). This step may include utilizing a temporary adhesive, such as tape 16 or other temporary attachment means, to secure the heat-activated design implement 14 to the surface of the workpiece 12. The method may include manipulating a heat press 100 to position a curved engagement surface 152 of a heat plate 150 of the heat press 100 adjacent the heat-activated design implement 14 and adjacent the workpiece 12. The method may then include pressing the curved engagement surface 152 into contact/engagement with the heat-activated design implement 14 in order to apply a compressive force to the heat-activated design implement 14 and the section of the workpiece 12 that are disposed between the curved engagement surface 152 of the heat plate 150 and the hat form 300. In various embodiments, a protective layer may optionally be disposed between the heat plate 150 and the heat-activated design implement 14 and/or the workpiece 12 to prevent the heat plate from making direct contact with said components. The method may include moving the heat press back and forth in a side to side-type movement, as shown in FIG. 10D.

In various embodiments, before performing pressing the heat press 100 toward the workpiece 12, the method may include activating (i.e., turning on) the heating coils in the heat plate 150 and/or allowing the heat plate 150 to reach a desired temperature. The heat press 100 may include one or more buttons for actuating/controlling the heat press 100, or the heat press 100 may be coupled in control communication with a controller or computing device that remotely (e.g., via wired or wireless connection) controls the heat press 100.

Figure 11:
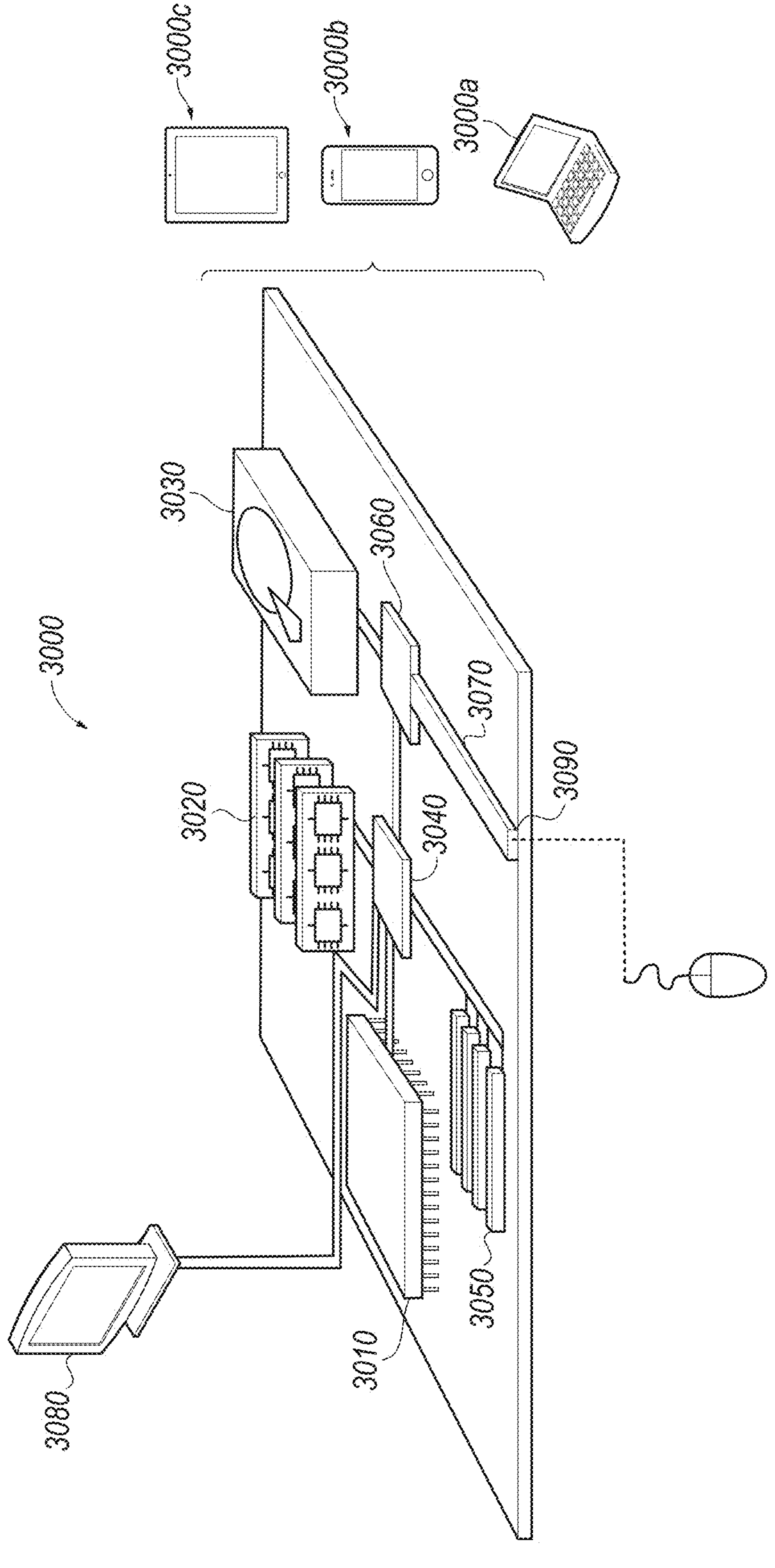
FIG. 11 is a schematic depiction of a computing device for controlling the heat press system (e.g., the heat press), according to various embodiments.

FIG. 11 is schematic view of an example computing device 3000 that may be used to implement the systems and methods described in this document. The computing device 3000 is intended to represent various forms of digital computers, such as laptops, desktops, smartphones, workstations, personal digital assistants, servers, blade servers, mainframes, and/or other appropriate computers. The components of the computing device 3000, such as 3010, 3020, 3030, 3040, 3050, and 3060, their connections and relationships, and their functions, are meant to be exemplary only, and are not meant to limit implementations of the inventions described and/or claimed in this document. Further, the various features and functionality of the computing device 3000 may be implemented in one or more standalone computer and/or one or more controllers, may be integrated within the disclosed heat press 100 itself, and/or may be implemented with various other computing devices, as described below.

The computing device 3000 may include a processor 3010, memory 3020, a storage device 3030, a high-speed interface/controller 3040 connecting to the memory 3020 and high-speed expansion ports 3050, and a low-speed interface/controller 3060 connecting to a low speed bus 3070 and a storage device 3030, according to various embodiments. Each of the components 3010, 3020, 3030, 3040, 3050, and 3060, may be interconnected using various busses, and may be mounted on a common motherboard or in other manners as appropriate.

The processor 3010 can process instructions for execution within the computing device 3000, including instructions stored in the memory 3020 or on the storage device 3030. The instructions may include operations to display graphical information for a graphical user interface (GUI) on an external input/output device, such as display 3080 coupled to high-speed interface 3040. In various implementations, multiple processors and/or multiple buses may be used, as appropriate, along with multiple memories and types of memory. Also, multiple computing devices 300 0 may be connected (e.g., as a server bank, a group of blade servers, or a multi-processor system), with each device providing portions of the operation/functionality.

The memory 3020 stores information non-transitorily within the computing device 3000. The memory 3020 may comprise a computer-readable medium, a volatile memory unit(s), and/or non-volatile memory unit(s). The non-transitory memory 3020 may be physical devices used to store programs (e.g., sequences of instructions) or data (e.g., program state information) on a temporary or permanent basis for use by the computing device 3000. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random-access memory (DRAM), static random access memory (SRAM), phase change memory (PCM) as well as disks or tapes.

The storage device 3030 may be capable of providing mass storage for the computing device 3000. In some implementations, the storage device 3030 is a computer-readable medium. In various implementations, the storage device 3030 may be a floppy disk device, a hard disk device, an optical disk device, a tape device, a flash memory or other similar solid state memory device, and/or an array of devices, including devices in a storage area network or other configurations. In various implementations, a computer program product is tangibly embodied in an information carrier. The computer program product may contain instructions that, when executed, perform one or more methods, such as those described herein. The information carrier may be a computer- or machine-readable medium, such as the memory 3020, the storage device 3030, and/or memory on processor 3010.

The high-speed controller 3040 may manage bandwidth-intensive operations for the computing device 3000, while the low-speed controller 3060 may manage lower bandwidth-intensive operations. Such allocation of duties is exemplary only. In some implementations, the high-speed controller 3040 is coupled to the memory 3020, the display 3080 (e.g., through a graphics processor or accelerator), and to the high-speed expansion ports 3050, which may accept various expansion cards (not shown). In some implementations, the low-speed controller 3060 is coupled to the storage device 3030 and a low-speed expansion port 3090. The low-speed expansion port 3090, which may include various communication ports (e.g., USB, Bluetooth, Ethernet, wireless Ethernet), may be coupled to one or more input/output devices, such as a keyboard, a pointing device, a scanner, and/or a networking device such as a switch or router, e.g., through a network adapter.

The computing device 3000 may be implemented in various forms. For example, the computing device 3000 may be implemented in one or a combination of the heat press 100, a laptop computer 3000*a*, a mobile device 3000*b*, a tablet device 3000*c*, and/or the following components. In various implementations of the systems, operations, functionality, and techniques described herein can be realized in digital electronic and/or optical circuitry, integrated circuitry, FPGA (field programmable gate array), specially designed ASICs (application specific integrated circuits), programmable logic device, discrete gate or transistor logic, discrete hardware components, computer hardware, firmware, software, and/or combinations thereof.

The processes, functions, operations, and/or logic flows described in this specification can be performed by one or more programmable processors, also referred to as data processing hardware, executing one or more computer programs to perform functions by operating on input data and generating output. The processor and the memory can be supplemented by, or incorporated in, special purpose logic circuitry. Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data.

Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

These computer programs (also known as programs, software, software applications, and/or code) include machine instructions for a processor and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term “machine-readable signal” refers to any signal used to provide machine instructions and/or data to a programmable processor.

The term “non-transitory” is to be understood to remove only propagating transitory signals per se from the claim scope and does not relinquish rights to all standard computer-readable media that are not only propagating transitory signals per se. Stated another way, the meaning of the term “non-transitory computer-readable medium” and “non-transitory computer-readable storage medium” should be construed to exclude only those types of transitory computer-readable media which were found in In Re Nuijten to fall outside the scope of patentable subject matter under 35 U.S.C. § 101.

A software application (i.e., a software resource) may refer to computer software that causes a computing device to perform a task. In some examples, a software application may be referred to as an “application,” an “app,” or a “program.” Example applications include, but are not limited to, system diagnostic applications, system management applications, system maintenance applications, word processing applications, spreadsheet applications, messaging applications, media streaming applications, social networking applications, and gaming applications.

To provide for interaction with a user, one or more aspects of the disclosure can be implemented on a computer having a display device, e.g., a CRT (cathode ray tube), LCD (liquid crystal display) monitor, or touch screen (e.g., a display of a user device) for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user’s client device in response to requests received from the web browser.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure.

Reference throughout this specification to features, advantages, or similar language does not imply that all the features and advantages that may be realized with the present disclosure should be or are in any single embodiment of the invention. Rather, language referring to the features and advantages is understood to mean that a specific feature, advantage, or characteristic described in connection with an embodiment is included in at least one embodiment of the subject matter disclosed herein. Thus, discussion of the features and advantages, and similar language, throughout this specification may, but do not necessarily, refer to the same embodiment.

Furthermore, the described features, advantages, and characteristics of the disclosure may be combined in any suitable manner in one or more embodiments. One skilled in the relevant art will recognize that the subject matter of the present application may be practiced without one or more of the specific features or advantages of a particular embodiment. In other instances, additional features and advantages may be recognized in certain embodiments that may not be present in all embodiments of the disclosure. Further, in some instances, well-known structures, materials, or operations are not shown or described in detail to avoid obscuring aspects of the subject matter of the present disclosure. No claim element is intended to invoke 35 U.S.C. 112(f) unless the element is expressly recited using the phrase “means for.”

As used herein, the terms “including,” “comprising,” “having,” and variations thereof mean “including but not limited to” unless expressly specified otherwise. Accordingly, the terms “including,” “comprising,” “having,” and variations thereof are intended to cover a non-exclusive inclusion, such that a process, method, article, or apparatus that comprises a list of elements does not include only those elements but may include other elements not expressly listed or inherent to such process, method, article, or apparatus. An enumerated listing of items does not imply that any or all of the items are mutually exclusive and/or mutually inclusive, unless expressly specified otherwise.

Further, in the detailed description herein, references to “one embodiment,” “an embodiment,” “some embodiments,” “various embodiments,” “one example,” “an example,” “some examples,” “various examples,” “one implementation,” “an implementation,” “some implementations,” “various implementations,” “one aspect,” “an aspect,” “some aspects,” “various aspects,” etc., indicate that the embodiment, example, implementation, and/or aspect described may include a particular feature, structure, or characteristic, but every embodiment, example, implementation, and/or aspect may not necessarily include the particular feature, structure, or characteristic. Moreover, such phrases are not necessarily referring to the same embodiment, example, implementation, or aspect. Thus, when a particular feature, structure, or characteristic is described in connection with an embodiment, example, implementation, and/or aspect, it is submitted that it is within the knowledge of one skilled in the art to affect such feature, structure, or characteristic in connection with other embodiments, examples, implementations, and/or aspects, whether or not explicitly described. Absent an express correlation to indicate otherwise, features, structure, components, characteristics, and/or functionality may be associated with one or more embodiments, examples, implementations, and/or aspects of the present disclosure. After reading the description, it will be apparent to one skilled in the relevant art how to implement the disclosure in alternative configurations.

The scope of the disclosure is to be limited by nothing other than the appended claims, in which reference to an element in the singular is not intended to mean “one and only one” unless explicitly so stated, but rather “one or more.” It is to be understood that unless specifically stated otherwise, references to “a,” “an,” and/or “the” may include one or more than one and that reference to an item in the singular may also include the item in the plural. Further, the term “plurality” can be defined as “at least two.” As used herein, the phrase “at least one of”, when used with a list of items, means different combinations of one or more of the listed items may be used and only one of the items in the list may be needed. The item may be a particular object, thing, or category. Moreover, where a phrase similar to “at least one of A, B, and C” is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A, B, and C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

All ranges and ratio limits disclosed herein may be combined. Numbers, percentages, ratios, or other values stated herein are intended to include that value, and also other values that are "about" or "approximately" the stated value, as would be appreciated by one of ordinary skill in the art encompassed by embodiments of the present disclosure, unless otherwise defined herein. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

Different cross-hatching may be used throughout the figures to denote different parts but not necessarily to denote the same or different materials. Surface shading lines may be used throughout the figures to denote different parts or areas but not necessarily to denote the same or different materials. In some cases, reference coordinates may be specific to each figure. Furthermore, the connecting lines shown in the various figures contained herein are intended to represent exemplary functional relationships and/or physical couplings between the various elements. It should be noted that many alternative or additional functional relationships or physical connections may be present in a practical system.

Any reference to attached, fixed, connected or the like may include permanent, removable, temporary, partial, full and/or any other possible attachment option. Additionally, any reference to without contact (or similar phrases) may also include reduced contact or minimal contact. In the above description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

The schematic flow chart diagrams included herein are generally set forth as logical flow chart diagrams. As such, the depicted order and labeled steps are indicative of one or more embodiments of the presented method. The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. Other steps and methods may be conceived that are equivalent in function, logic, or effect to one or more steps, or portions thereof, of the illustrated method.

Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown. Furthermore, no element, component, or method step in the present disclosure is intended to be dedicated to the public regardless of whether the element, component, or method step is explicitly recited in the claims.

The subject matter of the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A hat form of a heat press system, the hat form comprising:
- a cover;
- a base coupled to the cover, the cover and the base together defining an internal volume of the hat form;
- a support body extending from the base into the internal volume; and
- a fill material disposed within and at least partially occupying the internal volume;

wherein:
- the support body is an entirely internal component of the hat form such that the support body is completely surrounded collectively by the cover, the base, and the fill material; and
- the fill material is a granular material comprising loose discrete macroscopic particles.

2. The hat form of claim 1, wherein the cover comprises a heat resistant fabric.

3. The hat form of claim 1, wherein the cover comprises a metallic coating.

4. The hat form of claim 1, wherein the base has a perimeter, wherein the cover is coupled to the base along the perimeter.

5. The hat form of claim 1, wherein the base comprises a polyester fabric.

6. The hat form of claim 1, further comprising a handle coupled to the base.

7. The hat form of claim 1, wherein the support body comprises a frustoconical shape.

8. The hat form of claim 1, wherein a volume ratio of the fill material to the support body in the internal volume is between about 1.5:1 and about 3:1.

9. The hat form of claim 1, wherein the fill material occupies more than 50% of the internal volume and the support body occupies less than 50% of the internal volume.

10. The hat form of claim 1, wherein the support body has a higher density than the fill material such that the support body provides an added degree of structure and weight to a lower portion of the hat form adjacent the base.

11. The hat form of claim 1, wherein the granular material comprises a conglomeration of shells from at least one of nuts, drupes, and/or legumes.

12. The hat form of claim 1, wherein the granular material comprises walnut shells.

13. The hat form of claim 1, further comprising a liner disposed between the fill material and the support body.

14. The hat form of claim 1, further comprising a liner disposed between the support body and the base.

15. The hat form of claim 1, further comprising a liner disposed between the cover and the fill material.

16. A hat form of a heat press system, the hat form comprising:

a cover;

a base coupled to the cover, the cover and the base together defining an internal volume of the hat form;

a fill material disposed within and at least partially occupying the internal volume; and a handle strap coupled to a bottom surface of the base and extending at least partially across the bottom surface of the base.

17. The hat form of claim 16, further comprising a support body extending from the base into the internal volume.

18. The hat form of claim 17, wherein the support body is an entirely internal component of the hat form such that the support body is completely surrounded collectively by the cover, the base, and the fill material.

19. The hat form of claim 17, wherein the support body has a higher density than the fill material such that the support body provides an added degree of structure and weight to a lower portion of the hat form adjacent the base.

20. The hat form of claim 16, wherein the fill material is a granular material comprising loose discrete macroscopic particles.

* * * * *